US008429455B2

(12) United States Patent
Nagai et al.

(10) Patent No.: US 8,429,455 B2
(45) Date of Patent: Apr. 23, 2013

(54) COMPUTER SYSTEM MANAGEMENT METHOD AND MANAGEMENT SYSTEM

(75) Inventors: Takayuki Nagai, Machida (JP); Masashi Kunii, Yokohama (JP); Mineyoshi Masuda, Kawasaki (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 334 days.

(21) Appl. No.: 12/995,133

(22) PCT Filed: Jul. 28, 2010

(86) PCT No.: PCT/JP2010/062696
§ 371 (c)(1),
(2), (4) Date: Nov. 29, 2010

(87) PCT Pub. No.: WO2012/008058
PCT Pub. Date: Jan. 19, 2012

(65) Prior Publication Data

US 2012/0017127 A1 Jan. 19, 2012

(30) Foreign Application Priority Data

Jul. 16, 2010 (JP) ................................ 2010-161724

(51) Int. Cl.
*G06F 11/00* (2006.01)

(52) U.S. Cl.
USPC ............. 714/26; 714/25; 714/47.1; 714/47.3; 714/57

(58) Field of Classification Search .................... 714/25, 714/26, 47.1, 47.3, 57
See application file for complete search history.

(56) References Cited

U.S. PATENT DOCUMENTS

| | | | | |
|---|---|---|---|---|
| 6,119,074 | A * | 9/2000 | Sarangapani | 702/185 |
| 7,107,185 | B1 | 9/2006 | Yemini et al. | |
| 7,949,906 | B2 * | 5/2011 | Ikegami | 714/57 |
| 8,112,378 | B2 * | 2/2012 | Kudo et al. | 706/47 |
| 2009/0265585 | A1 * | 10/2009 | Ikegami | 714/46 |
| 2009/0300428 | A1 | 12/2009 | Matsumoto et al. | |
| 2011/0209010 | A1 * | 8/2011 | Morimura et al. | 714/57 |
| 2011/0264956 | A1 * | 10/2011 | Ito et al. | 714/20 |
| 2011/0265006 | A1 * | 10/2011 | Morimura et al. | 715/736 |

FOREIGN PATENT DOCUMENTS

| | | |
|---|---|---|
| JP | 7-030540 | 1/1995 |
| JP | 2010-128661 | 6/2010 |
| WO | WO 2009-144969 | 12/2009 |

OTHER PUBLICATIONS

PCT International Search Report and Written Opinion on Application No. PCT/JP2010/062696 dated Oct. 26, 2010 (4 pages).

* cited by examiner

*Primary Examiner* — Charles Ehne
(74) *Attorney, Agent, or Firm* — Foley & Lardner LLP

(57) ABSTRACT

There is provided a failure analysis function capable of reducing the time required to resolve a failure in a piece of equipment to be monitored. When the failure analysis function senses that the status of a piece of equipment which had been abnormal has returned to normal, it displays, of failure analysis results, one based on an equipment abnormality which has been resolved in a GUI separately from the other analysis results. If a failure analysis result is derived based on a plurality of failure events, the failure analysis function displays the failure analysis result in the GUI separately from the other failure analysis results when all of the failure events are confirmed to be resolved (see FIG. 16).

14 Claims, 20 Drawing Sheets

| Apparatus ID | Device ID | Metric | Equipment OS | Performance value | Alert issuance threshold value | Threshold value type | Status |
|---|---|---|---|---|---|---|---|
| SYS1 | CTL1 | Operating ratio | - | 40(%) | 20(%) | Upper limit | Threshold value abnormality |
| SYS1 | CTL2 | Operating ratio | - | 60(%) | 80(%) | Upper limit | Normal |
| SYS1 | PORT1 | I/O amount per unit time | - | 300(IOPS) | 1000 (IOPS) | Upper limit | Normal |
| SYS1 | PORT2 | I/O amount per unit time | - | 400(IOPS) | 1000 (IOPS) | Upper limit | Normal |
| HOST1 | E: | Response time | Linux | 5(msec) | 10(msec) | Upper limit | Normal |
| HOST1 | F: | Response time | Linux | 5(msec) | 10(msec) | Upper limit | Normal |
| HOST2 | E: | Response time | Windows | 5(msec) | 10(msec) | Upper limit | Normal |
| HOST3 | E: | Response time | Windows | 15(msec) | 10(msec) | Upper limit | Normal |
| : | : | : | : | : | : | : | : |

| Apparatus ID (33210) | Volume ID (33220) | Port name (33230) | Controller name (33240) | Connection destination host ID (33250) | Connection destination drive name (33260) |
|---|---|---|---|---|---|
| SYS1 | VOL1 | PORT1 | CTL1 | HOST1 | E: |
| | VOL2 | PORT1 | CTL1 | HOST1 | F: |
| | VOL3 | PORT1 | CTL1 | HOST2 | E: |
| | VOL5 | PORT2 | CTL2 | HOST3 | E: |
| : | : | : | : | : | : |

| Event ID | Apparatus ID | Apparatus part ID | Metric | Equipment OS | Status | Analyzed flag | Occurrence date and time |
|---|---|---|---|---|---|---|---|
| EV1 | SYS1 | CTL1 | Operating ratio | - | Threshold value abnormality | No | 2010-01-01 15:00:00 |
| EV2 | SYS1 | CTL1 | Operating ratio | - | Normal | No | 2010-01-01 15:05:00 |
| EV3 | HOST1 | E: | Response time | Linux | Threshold value abnormality | No | 2010-01-01 15:00:00 |
| EV4 | HOST1 | E: | Response time | Linux | Normal | No | 2010-01-01 15:10:00 |
| EV5 | HOST1 | E: | Response time | Linux | Threshold value abnormality | No | 2010-01-01 16:00:00 |
| EV6 | HOST1 | E: | Response time | Linux | Normal | No | 2010-01-01 16:05:00 |
| : | : | : | : | : | : | : | : |

| | | Apparatus type | Apparatus part type | Metric | Status |
|---|---|---|---|---|---|
| 33410 | Condition part | Host computer | Drive | Response time | Threshold value abnormality |
| | | Storage apparatus | Controller | Operating ratio | Threshold value abnormality |
| 33420 | Conclusion part | Storage apparatus | Controller | Operating ratio | Bottleneck |
| 33430 | Generic rule ID | Rule1 | | | |
| 33440 | Applicable topology | Volume topology management table | | | |

| | | Apparatus type | Apparatus part type | Metric | Status |
|---|---|---|---|---|---|
| 33410 | Condition part | Host computer | Drive | Response time | Threshold value abnormality |
| | | Storage apparatus | Controller | Operating ratio | Normal |
| | | Storage apparatus | Port | I/O amount per unit time | Normal |
| 33420 | Conclusion part | IP switch | - | - | Bottleneck |
| 33430 | Generic rule ID | Rule2 | | | |
| 33440 | Applicable topology | Volume topology management table | | | |

| | | Apparatus ID | Apparatus part ID | Metric | Status |
|---|---|---|---|---|---|
| 33510 | Condition part | HOST1 | E: | Response time | Threshold value abnormality |
| | | SYS1 | CTL1 | Operating ratio | Threshold value abnormality |
| 33520 | Conclusion part | SYS1 | CTL1 | Operating ratio | Bottleneck |
| 33530 | Expansion rule ID | ExRule1-1 | | | |
| 33540 | Generic rule ID before expansion | Rule-1 | | | |

| | | Apparatus ID | Apparatus part ID | Metric | Status |
|---|---|---|---|---|---|
| 33510 | Condition part | HOST1 | F: | Response time | Threshold value abnormality |
| | | SYS1 | CTL1 | Operating ratio | Threshold value abnormality |
| 33520 | Conclusion part | SYS1 | CTL1 | Operating ratio | Bottleneck |
| 33530 | Expansion rule ID | ExRule1-2 | | | |
| 33540 | Generic rule ID before expansion | Rule-1 | | | |

| | | Apparatus ID | Apparatus part ID | Metric | Status |
|---|---|---|---|---|---|
| 33510 | Condition part | HOST2 | E: | Response time | Threshold value abnormality |
| | | SYS1 | CTL1 | Operating ratio | Threshold value abnormality |
| 33520 | Conclusion part | SYS1 | CTL1 | Operating ratio | Bottleneck |
| 33530 | Expansion rule ID | ExRule1-3 | | | |
| 33540 | Generic rule ID before expansion | Rule-1 | | | |

| | | Apparatus ID | Apparatus part ID | Metric | Status |
|---|---|---|---|---|---|
| 33510 | Condition part | HOST3 | E: | Response time | Threshold value abnormality |
| | | SYS1 | CTL2 | Operating ratio | Threshold value abnormality |
| 33520 | Conclusion part | SYS1 | CTL2 | Operating ratio | Bottleneck |
| 33530 | Expansion rule ID | ExRule1-4 | | | |
| 33540 | Generic rule ID before expansion | Rule-1 | | | |

FIG. 10

| Cause apparatus ID (33610) | Cause part ID (33620) | Metric (33630) | Expansion rule ID (33640) | Certainty factor (33650) | Received event ID (33660) | Resolved flag (33670) | Failure period (33680) | Instantaneous failure flag (33690) | Analysis execution date and time (33695) |
|---|---|---|---|---|---|---|---|---|---|
| SYS1 | CTL1 | Operating ratio | ExRule1-1 | 2/2 | EV1 | No | - | No | 2010-01-01 15:00:00 |
| | | | | | EV3 | No | - | | |
| SYS1 | CTL1 | Operating ratio | ExRule1-1 | 1/2 | EV5 | No | - | No | 2010-01-01 16:00:00 |
| : | : | : | : | : | : | : | : | | : |

| Apparatus type | Device type | Metric | Status | Availability of normalization |
|---|---|---|---|---|
| Storage | Controller | Operating ratio | Threshold value abnormality | No |
| | | | Normal | Yes |
| | | | Unknown | No |
| | Port | I/O amount per unit time | Threshold value abnormality | No |
| | | | Normal | Yes |
| | | | Unknown | No |
| Host computer | Drive | Response time | Threshold value abnormality | No |
| | | | Normal | Yes |
| | | | Unknown | No |
| : | : | : | | : |

| Apparatus ID | Device type | Metric | Equipment type | Acquired value type |
|---|---|---|---|---|
| Storage | Controller | Operating ratio | - | Integrated value |
| | Port | I/O amount per unit time | - | Integrated value |
| Host computer | Drive | Response time | Windows | Integrated value |
| | | | Linux | Instantaneous value |
| : | : | : | : | : |

Figure 16:
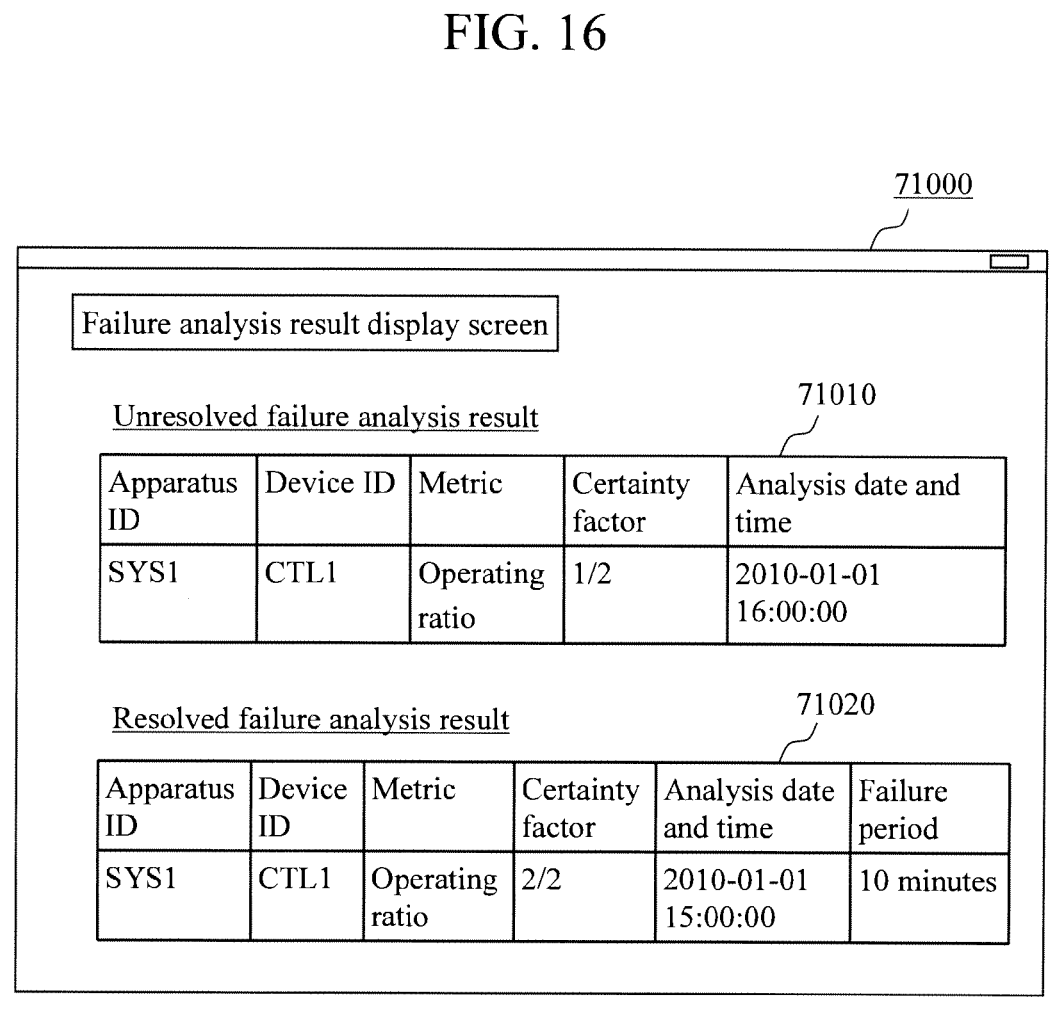

Failure analysis result display screen

Unresolved failure analysis result

71010

| Apparatus ID | Device ID | Metric | Certainty factor | Analysis date and time |
|---|---|---|---|---|
| SYS1 | CTL1 | Operating ratio | 1/2 | 2010-01-01 16:00:00 |

Resolved failure analysis result

71020

| Apparatus ID | Device ID | Metric | Certainty factor | Analysis date and time | Failure period |
|---|---|---|---|---|---|
| SYS1 | CTL1 | Operating ratio | 2/2 | 2010-01-01 15:00:00 | 10 minutes |

Figure 18:
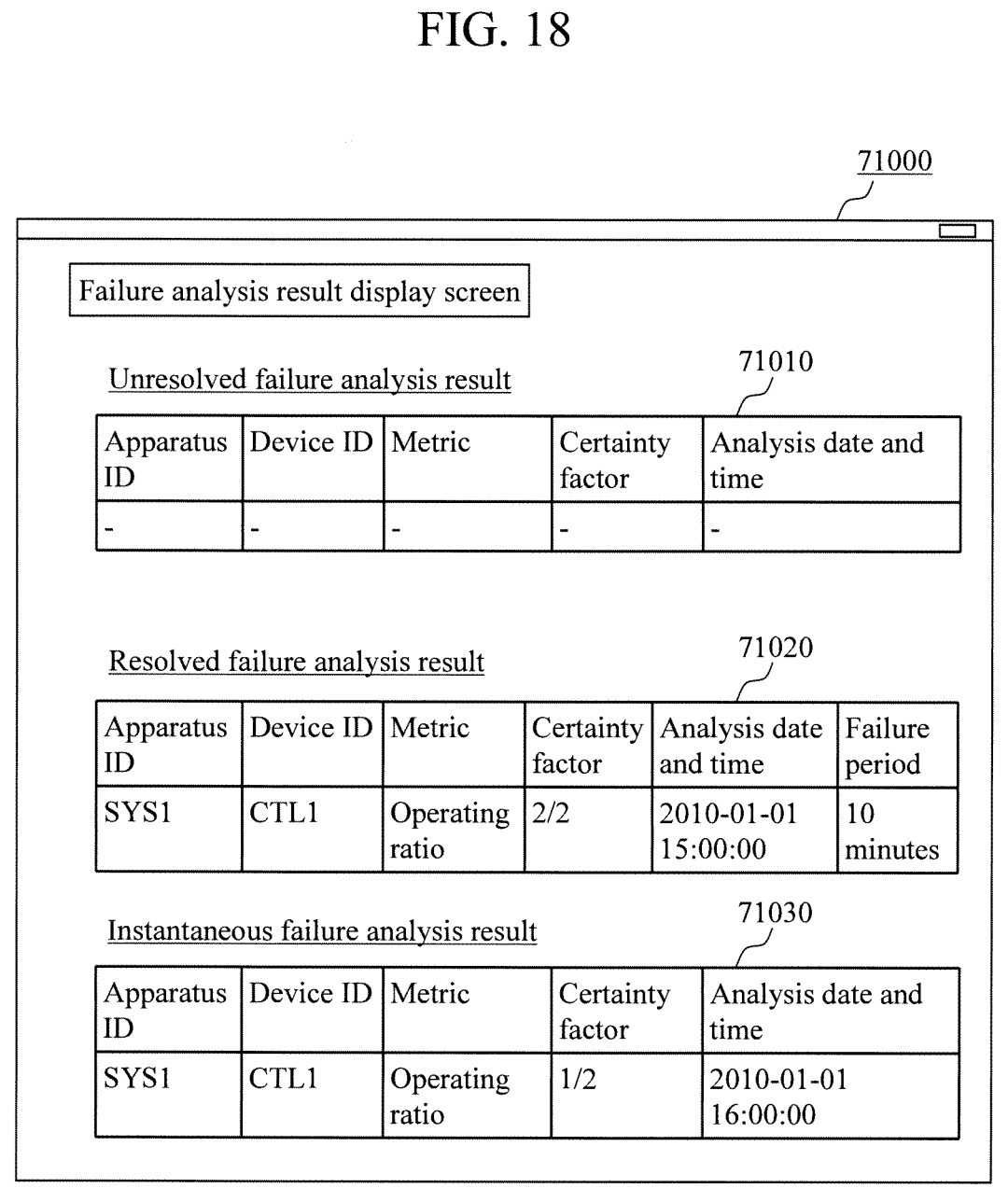

Failure analysis result display screen

Unresolved failure analysis result

71010

| Apparatus ID | Device ID | Metric | Certainty factor | Analysis date and time |
|---|---|---|---|---|
| - | - | - | - | - |

Resolved failure analysis result

71020

| Apparatus ID | Device ID | Metric | Certainty factor | Analysis date and time | Failure period |
|---|---|---|---|---|---|
| SYS1 | CTL1 | Operating ratio | 2/2 | 2010-01-01 15:00:00 | 10 minutes |

Instantaneous failure analysis result

71030

| Apparatus ID | Device ID | Metric | Certainty factor | Analysis date and time |
|---|---|---|---|---|
| SYS1 | CTL1 | Operating ratio | 1/2 | 2010-01-01 16:00:00 |

| Cause apparatus ID (33610) | Cause part ID (33620) | Metric (33630) | Expansion rule ID (33640) | Certainty factor (33650) | Received event ID (33660) | Resolved flag (33670) | Failure period (33680) | Response priority (33691) | Analysis execution date and time (33695) |
|---|---|---|---|---|---|---|---|---|---|
| SYS1 | CTL1 | Operating ratio | ExRule1-1 | 2/2 | EV1 | No | - | 10 | 2010-01-01 15:00:00 |
| | | | | | EV3 | No | - | | |
| SYS1 | CTL1 | Operating ratio | ExRule1-1 | 1/2 | EV5 | No | - | 10 | 2010-01-01 16:00:00 |
| : | : | : | : | : | : | : | : | | : |

Figure 21:
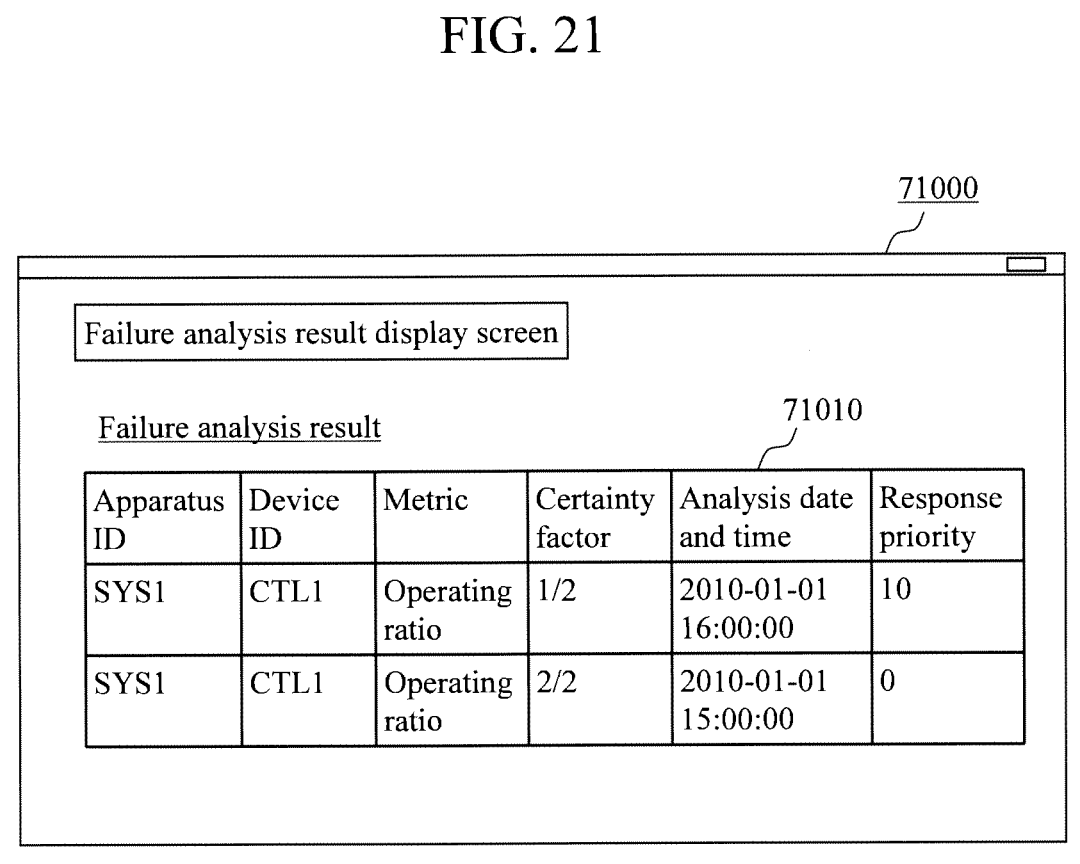

Failure analysis result display screen

Failure analysis result

71010

| Apparatus ID | Device ID | Metric | Certainty factor | Analysis date and time | Response priority |
|---|---|---|---|---|---|
| SYS1 | CTL1 | Operating ratio | 1/2 | 2010-01-01 16:00:00 | 10 |
| SYS1 | CTL1 | Operating ratio | 2/2 | 2010-01-01 15:00:00 | 0 |

COMPUTER SYSTEM MANAGEMENT METHOD AND MANAGEMENT SYSTEM

CROSS-REFERENCE TO RELATED PATENT APPLICATIONS

Japan Priority Application 2010-161724, filed Jul. 16, 2010 and PCT Application PCT/JP2010/062696 filed Jul. 28, 2010 including the specification, drawings, claims and abstract, are incorporated herein by reference in their entirety.

TECHNICAL FIELD

The present invention relates to a management method and a management system for a computer system and, for example, to a technique for managing a failure in a host computer, a network switch, and a storage system constituting a computer system.

BACKGROUND ART

When a computer system is managed, a process of detecting a causative event among a plurality of failures or symptoms of failures sensed in the system is performed, as illustrated in, e.g., Patent Literature 1. More specifically, in Patent Literature 1, an event is generated from an excess of a performance value over a threshold value in a piece of equipment under the control, and pieces of information on events are accumulated in an event DB, using management software. The management software has an analysis engine for analyzing causal relationships between a plurality of failure events which have occurred in pieces of equipment under the control. The analysis engine accesses a configuration DB storing inventory information of each piece of equipment under the control, recognizes components of the piece of equipment on a path as an I/O path, and recognizes ones of the components which may affect the performance of a logical volume on a host as a group called a "topology." If an event occurs, the analysis engine applies an analysis rule which is composed of a condition statement and an analysis result determined in advance to each topology to build an expansion rule. The expansion rule includes a cause event responsible for degradation in the performance of a different apparatus and a group of related events caused by the cause event. More specifically, an event described as the root cause of a failure in the THEN part of the rule is a cause event, and ones other than the cause event of events described in the IF part are related events.

CITATION LIST

Patent Literature

Patent Literature 1: U.S. Pat. No. 7,107,185

SUMMARY OF INVENTION

Technical Problem

The failure analysis function according to Patent Literature 1 describes a combination of events received from a piece of equipment to be managed and a candidate for the cause of a failure as a rule in the form of IF-THEN statements in advance. The failure analysis function calculates the incidence of an event described in the IF part of each rule, thereby calculating the certainty factor of a failure cause candidate described in the THEN part. A calculated certainty factor and a failure cause candidate are displayed in a GUI at a user's request.

However, if failures occur frequently in a short period, this conventional failure analysis function saves a larger number of failure analysis results, and a manager may be unable to determine which failure is really to be responded to. That is, a conventional failure analysis result does not include information on response priority, and the time until the manager refers to an analysis result for which measures are to be taken is long. This results in an increase in the time required to resolve the failure.

Solution to Problem

The present invention has been made in consideration of the above-described circumstances, and has as its object to provide a failure analysis function capable of reducing the time required to resolve a failure in a piece of equipment to be monitored.

In order to solve the above-described problem, according to the present invention, when it is sensed after a failure cause analysis process that the status of a piece of equipment which had been abnormal has returned to normal, of failure analysis results, one based on an equipment abnormality which has been resolved is displayed in a GUI separately from the other analysis results. If a failure analysis result is derived based on a plurality of failure events, the failure analysis result is displayed in the GUI separately from the other failure analysis results when all of the failure events are confirmed to be resolved.

According to the present invention, if a failure event which occurs when a piece of equipment to be managed is not in a condition interfering with business is received and is resolved immediately after the occurrence, a failure cause candidate is saved as a failure analysis result together with a certainty factor when it is sensed that the status of a piece of equipment which had been abnormal has returned to normal, and an equipment abnormality, based on which the failure event has been issued, is completely resolved. The failure analysis result is displayed in a GUI separately from other analysis results.

More specifically, according to the present invention, a management server acquires a processing performance value indicating processing performance of a node apparatus, senses a status of the node apparatus from the acquired processing performance value, and applies the sensed status to an analysis rule indicating a relationship between a combination of one or more condition events which may occur in the node apparatus and a conclusion event which is presumed to be a root cause of the combination of the condition events. The management server also calculates a certainty factor which is information indicating possibility of occurrence of a failure in the node apparatus and determines, from the certainty factor, whether a failure has occurred in the node apparatus. The management server further displays an unresolved failure analysis result which is a failure analysis result for the node apparatus when the status remains abnormal and a resolved failure analysis result which is a failure analysis result for the node apparatus when the status has changed from abnormal to normal on a display screen without changing information on the certainty factor if it is determined that a failure has occurred in the node apparatus. When analysis results are to be displayed, an unresolved failure analysis result and a resolved failure analysis result may be separately displayed on the display screen, and processing priority may be displayed on the display screen to accompany each of the unresolved failure analysis result and the resolved failure analysis result.

Further features of the present invention will be apparent from the Best Mode for Carrying Out the Invention and the accompanying drawings below.

Advantageous Effects of Invention

According to the present invention, when a failure analysis result is to be presented to a manager (user), the failure analysis result is displayed to reflect a received notification of failure resolution. This allows the manager to easily determine the response priority for the analysis result and a reduction in the load required for analysis result checking.

BRIEF DESCRIPTION OF THE DRAWINGS

FIG. 5 is a chart showing a configuration example of an apparatus performance management table possessed by the management server.

FIG. 6 is a chart showing a configuration example of a volume topology management table possessed by the management server.

FIG. 7 is a chart showing a configuration example of an event management table possessed by the management server.

FIG. 8A is a chart showing a configuration example (1) of a generic rule possessed by the management server.

FIG. 8B is a chart showing a configuration example (2) of a generic rule possessed by the management server.

FIG. 9A is a chart showing a configuration example (1) of an expansion rule possessed by the management server.

FIG. 9B is a chart showing a configuration example (2) of an expansion rule possessed by the management server.

FIG. 9C is a chart showing a configuration example (3) of an expansion rule possessed by the management server.

FIG. 9D is a chart showing a configuration example (4) of an expansion rule possessed by the management server.

FIG. 10 is a chart showing a configuration example of an analysis result management table possessed by the management server.

FIG. 13 is a chart showing a configuration example of an event type management table possessed by the management server.

FIG. 14 is a chart showing a configuration example of a performance metric management table possessed by the management server.

FIG. 16 is a view showing a configuration example of a failure analysis result screen to be displayed by the management server according to the first embodiment.

FIG. 18 is a view showing a configuration example of a failure analysis result screen to be displayed by the management server according to the second embodiment.

FIG. 19 is a chart showing a configuration example of an analysis result management table possessed by a management server according to a third embodiment.

FIG. 21 is a view showing a configuration example of a failure analysis result screen to be displayed by the management server according to the third embodiment.

DESCRIPTION OF EMBODIMENTS

Figure 1:
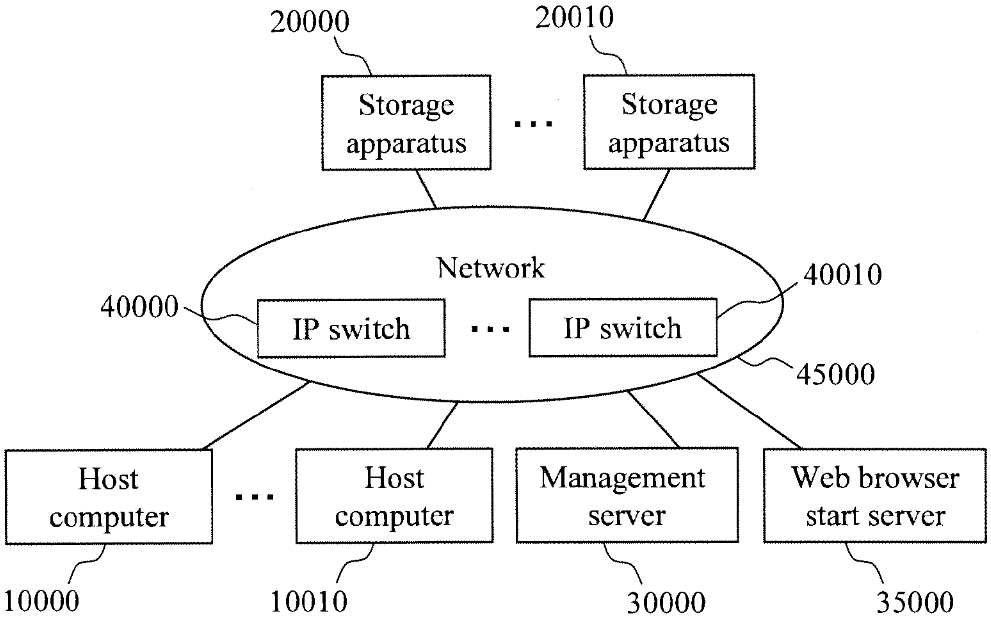
FIG. 1 is a diagram showing a physical configuration example of a computer system.

Embodiments of the present invention relate to analysis of the root cause of a failure plus resolution of the failure.

The embodiments of the present invention will be described below with reference to the accompanying drawings. It should be noted that the embodiments are intended only to implement the present invention and not intended to limit the technical scope of the present invention. Components common to the drawings are denoted by the same reference numerals.

Although the expression "aaa table" is used to refer to information used in the present invention in this specification, an expression such as "aaa chart," "aaa list," "aaa DB," or "aaa queue" may be used, or alternatively, the information may be expressed using something other than data structures such as a table, a list, a DB, and a queue. In order to indicate that information used in the present invention is independent of data structures, an "aaa table," an "aaa list," an "aaa DB," and an "aaa queue," or the like may be referred to as "aaa information."

When the content of each piece of information is described, the terms "identification information," "identifier," "name," "appellation" and "ID" may be used. The terms are interchangeable.

In the description of the processing operation of the present invention below, a "program" or a "module" may serve as the agent (subject) of operation. Since a program or a module performs given processing using a memory and a communication port (communication control apparatus) when the program or module is executed by a processor, a process with a program or a module serving as an agent (subject) may be read as a process with a processor serving as an agent (subject). A process disclosed with a program or a module as a subject may be replaced with a process to be performed by a computer such as a management server or an information processing apparatus. A part or the whole of a program may be implemented by dedicated hardware. Various programs may be installed onto each computer by a program distribution server or a storage medium.

(1) First Embodiment

A first embodiment relates to a resolved event reflection process by management software (e.g., included in a management server).

<System Configuration>

FIG. 1 is a diagram showing a physical configuration of a computer system according to the present invention. The computer system includes a storage apparatus 20000, a host computer 10000, a management server 30000, a Web browser start server 35000, and an IP switch 40000. The components are connected (coupled) over a network 45000.

The host computer 10000 to a host computer 10010 each receive a file I/O request from a client computer (not shown) connected (coupled) thereto and implement access to the storage apparatus 20000 to a storage apparatus 20010 in accordance with the file I/O request. The management server (management computer) 30000 manages the operation of the entire computer system.

The Web browser start server 35000 communicates with a GUI display processing module 32400 of the management server 30000 over the network 45000 and displays various types of information on a Web browser. A user manages an apparatus in the computer system by referring to information displayed in the Web browser on the Web browser start server. Note that the management server 30000 and the Web browser start server 35000 may be composed of one server.

<Internal Configuration of Host Computer>

Figure 2:
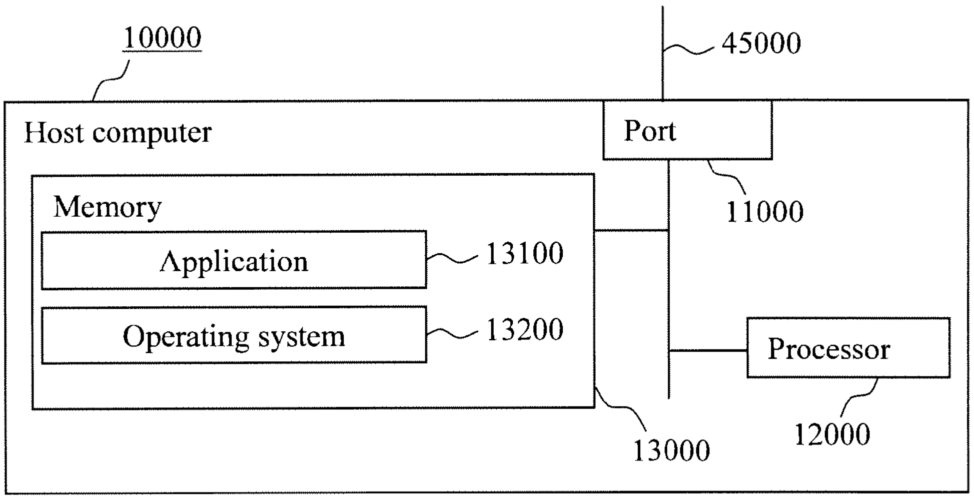
FIG. 2 is a diagram showing a detailed configuration example of a host computer.

FIG. 2 is a diagram showing a detailed internal configuration example of the host computer 10000 according to the present invention. The host computer 10000 includes a port 11000 for connection to the network 45000, a processor 12000, and a memory 13000 (and may optionally include a disk apparatus). The components are connected (coupled) to each other through a circuit such as an internal bus.

The memory 13000 stores a business application 13100 and an operating system 13200.

The business application 13100 uses a storage region provided by the operating system 13200 and performs data input and output (hereinafter referred to as I/O) on the storage region.

The operating system 13200 performs a process of causing the business application 13100 to recognize logical volumes on the storage apparatuses 20000 to 20010 connected (coupled) to the host computer 10000 over the network 45000 as storage regions.

The port 11000 is expressed as a single port including an I/O port for communicating with the storage apparatus 20000 using iSCSI and a management port for acquiring pieces of management information in the host computers 10000 to 10010 by the management server 30000 in FIG. 2. The port 11000, however, may be divided into an I/O port for communication using iSCSI and a management port.

<Internal Configuration of Storage Apparatus>

Figure 3:
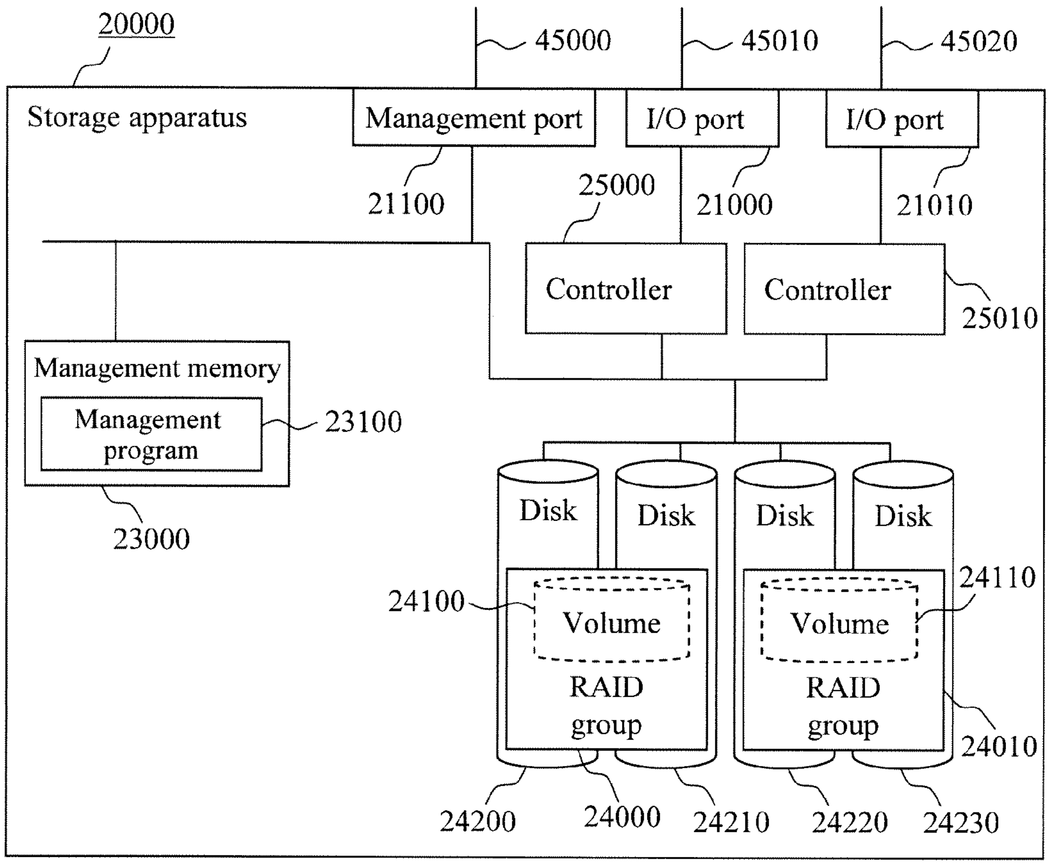
FIG. 3 is a diagram showing a detailed configuration example of a storage apparatus.

FIG. 3 is a diagram showing a detailed internal configuration example of the storage apparatus 20000 according to the present invention. The storage apparatus 20010 also has the same configuration.

The storage apparatus 20000 includes I/O ports 21000 and 21010 for connection to the host computer 10000 over the network 45000, a management port 21100 for connection to the management server 30000 over the network 45000, a management memory 23000 for storing various types of management information, RAID groups 24000 to 24010 for storing data, and controllers 25000 and 25010 for controlling data and management information in the management memory. The components are connected to each other through a circuit such as an internal bus. Note that connection of the RAID groups 24000 to 24010 more precisely refers to connection of a storage device constituting the RAID groups 24000 to 24010 to other components.

The management memory 23000 stores a management program 23100 for the storage apparatus. The management program 23100 communicates with the management server 30000 via the management port 21100 and provides configuration information of the storage apparatus 20000 to the management server 30000.

The RAID groups 24000 to 24010 are each composed of one or a plurality of ones of magnetic disks 24200, 24210, 24220, and 24230. If each RAID group is composed of a plurality of magnetic disks, the magnetic disks may be in a RAID configuration. The RAID groups 24000 to 24010 are logically divided into a plurality of volumes 24100 to 24110.

Note that if the logical volumes 24100 and 24110 are each constructed using storage regions of one or more magnetic disks, a RAID configuration need not be used. A storage device using a different storage medium such as a flash memory may be used to provide a storage region corresponding to a logical volume, instead of a magnetic disk.

The controllers 25000 and 25010 each incorporate a processor which performs control within the storage apparatus 20000 and a cache memory which temporarily stores data to be exchanged with the host computer 10000. Each controller is interposed between the corresponding I/O port and the RAID groups to exchange data therebetween.

The storage apparatus 20000 may have a configuration other than that in FIG. 3 described above as long as it provides the logical volumes to any of the host computers and includes a storage controller which receives an access request (referring to an I/O request) and performs reading from and writing to a storage device in response to the received access request and the storage device which provides a storage region. For example, a storage controller and a storage device which provides a storage region may be stored in separate housings. More specifically, although the management memory 23000 and the controllers 25000 and 25010 may be provided as separate components in the example in FIG. 3, they may be constructed as a one-piece storage controller. In addition, in this specification, the term storage system may be used as an expression which embraces a case where a storage controller and a storage device are present in a single housing or separate housings, instead of the term storage apparatus.

<Internal Configuration of Management Server>

Figure 4:
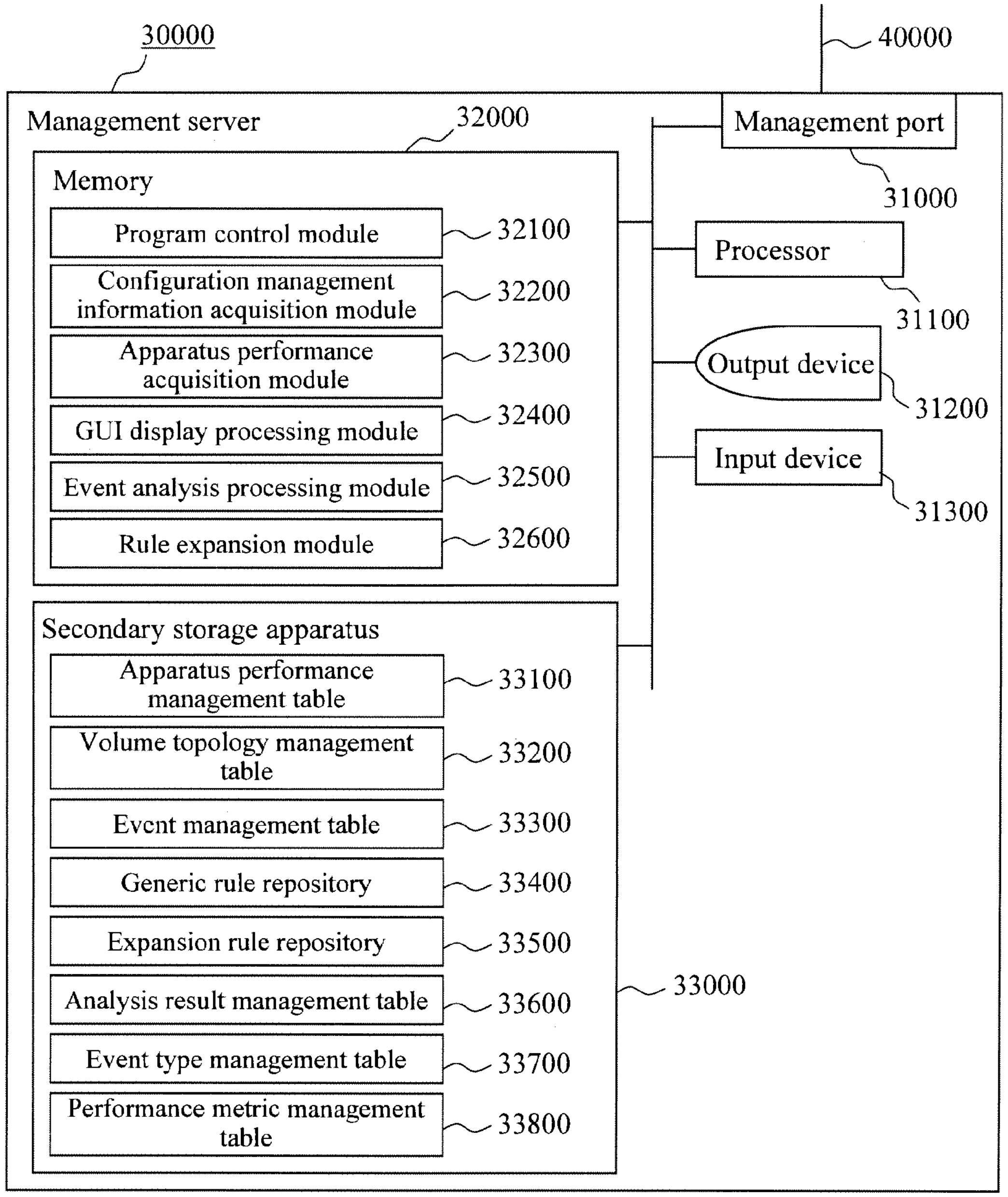
FIG. 4 is a diagram showing a detailed configuration example of a management server.

FIG. 4 is a diagram showing a detailed internal configuration example of the management server 30000 according to the present invention. The management server 30000 includes a management port 31000 for connection to the network 45000, a processor 31100, a memory 32000 such as a cache memory, a secondary storage apparatus (secondary storage region) 33000 such as an HDD, an output device 31200 for outputting a processing result (to be described later), such as a display apparatus, and an input device 31300 for a storage manager to enter instructions, such as a keyboard. The components are connected to each other through a circuit such as an internal bus.

The memory 32000 stores a program control module 32100, a configuration management information acquisition module 32200, an apparatus performance information acquisition module 32300, the GUI display processing module 32400, an event analysis processing module 32500, and a rule expansion module 32600. Note that although each module is provided as a software module of the memory 32000 in FIG. 4, the module may be provided as a hardware module. Alternatively, processing to be performed by each module may be provided as one or more program codes, and there may not be distinct boundaries between the modules. A module may be read as a program.

The secondary storage region 33000 stores an apparatus performance management table 33100, a volume topology management table 33200, an event management table 33300, a generic rule repository 33400, an expansion rule repository 33500, an analysis result management table 33600, an event type management table 33700, and a performance metric management table 33800. Note that the secondary storage apparatus 33000 may be composed of one or both of a semiconductor memory and a magnetic disk.

The GUI display processing module 32400 displays acquired configuration management information through the output device 31200 in response to a request from a manager through the input device 31300. Note that the input device and the output device may be separate devices or one or more integrated devices.

Note that although the management server (management computer) 30000 includes, for example, a keyboard, a pointer device, and the like as the input device 31300 and a display, a printer, and the like as the output device 31200, it may include an apparatus other than those described above. Alternatively, a serial interface or an Ethernet interface may be used instead of I/O devices, and a display computer including a display, a keyboard, or a pointer device may be connected to the interface. Entry and display at I/O devices may be replaced with transmission of information to be displayed to the display computer and reception of information to be inputted from the display computer, i.e., display and reception of inputs by the display computer.

In this specification, a set including one or more computers for managing a computer system (information processing system) 1 and displaying information to be displayed may be referred to as a management system. If the management server 30000 displays information to be displayed, the management server 30000 is a management system. A combination of the management server 30000 and a display computer (e.g., the Web browser start server 35000 in FIG. 1) also constitute a management system. A plurality of computers may implement processing equivalent to processing by a management server for higher-speed, higher-reliability management processing. In this case, the plurality of computers (which include a display computer if display is to be performed by a display computer) constitute a management system.

<Configuration of Apparatus Performance Management Table>

FIG. 5 is a chart showing a configuration example of the apparatus performance management table 33100 possessed by the management server 30000.

The apparatus performance management table 33100 includes, as constituent items, a field 33110 where an apparatus ID serving as the identifier of a piece of equipment to be managed is to be registered, a field 33120 where a device ID that is the identifier of a device in the piece of equipment to be managed is to be registered, a field 33130 where the metric name of performance information of the device to be managed is to be stored, a field 33140 where the OS type of the piece of equipment in which a threshold value abnormality (that means an abnormality determined on the basis of a threshold value) has been sensed is to be registered, a field 33150 where a performance value of the device to be managed that is acquired from the apparatus is to be stored, a field 33160 where a threshold value that is the upper limit or the lower limit of the normal range for the performance value of the device to be managed is to be stored upon receipt of the threshold value entered by a user, a field 33170 where whether the threshold value is the upper limit or the lower limit of normal is to be registered, and a field 33180 where whether the performance value is a normal value or an abnormal value.

For example, it can be seen from the first row (the first entry) in FIG. 5 that the operating ratio of a processor in a controller CTL1 in a storage apparatus SYS1 is currently 40% (see the field 33150), that the management server 30000 determines the controller CTL1 to be overloaded if the operating ratio of the controller CTL1 exceeds 20% (see the field 33160), and that a performance value in this example is determined to be an abnormal value (see the field 33180).

Note that although I/O amount per unit time and operating ratio are given as examples of performance values of devices managed by the management server 30000, the management server 30000 may manage a performance value other than those.

<Configuration of Volume Topology Management Table>

FIG. 6 is a chart showing a configuration example of the volume topology management table 33200 possessed by the management server 30000.

The volume topology management table 33200 includes, as constituent items, a field 33210 where an apparatus ID serving as the identifier of a storage apparatus is to be registered, a field 33220 where a volume ID serving as the identifier of a volume possessed by the storage apparatus is to be registered, a field 33230 where a port ID serving as the identifier of a port to be used when the volume communicates with the host computer 10000 is to be registered, a field 32240 where the ID of a controller to be used at the time of communication between the port and the volume is to be registered, a field 33250 where the identifier of the host computer 10000, to which the volume is to connect, is to be registered, and a field 33260 where the drive name of a logical volume of the host computer 10000 whose substance is the volume is to be registered.

For example, it can be seen from the first row (the first entry) in FIG. 6 that a volume VOL1 of the storage apparatus SYS1 is connected to a host computer HOST1 through a port on the storage side denoted by reference characters PORT1 and the controller denoted by reference characters CTL1 and is recognized as a logical volume (E:) on the host.

<Configuration of Event Management Table>

FIG. 7 is a chart showing a configuration example of the event management table 33300 possessed by the management server 30000. The event management table 33300 is appropriately referred to in a failure cause analysis process and a resolved event reflection process (to be described later).

The event management table 33300 includes, as constituent items, a field 33310 where an event ID serving as the identifier of an event itself is to be registered, a field 33320 where an apparatus ID serving as the identifier of a piece of equipment in which an event such as a threshold abnormality in an acquired performance value has occurred is to be registered, a field 33330 where the identifier of a part in the piece of equipment in which the event has occurred is to be registered, a field 33340 where the name of a metric for which the threshold value abnormality has been sensed is to be registered, a field 33350 where the OS type of the piece of equipment in which the threshold value abnormality has been sensed is to be registered, a field 33360 where the status of the part in the piece of equipment at the occurrence of the event is to be registered, a field 33370 where whether the event has been analyzed by the event analysis processing module 32500 (to be described later) is to be registered, and a field 33380 where the date and time when the event has occurred is to be registered.

For example, it can be seen from the first row (the first entry) in FIG. 7 that the management server 30000 senses a threshold value abnormality in a processor operating ratio in the controller denoted by reference characters CTL1 of the storage apparatus SYS1 and that the event ID of the threshold value abnormality is EV1. Note that a change from abnormal to normal may be registered as an event.

<Configuration of Generic Rule>

FIGS. 8A and 8B are charts showing configuration examples of a generic rule in the generic rule repository 33400 possessed by the management server 30000. A generic rule (the same is true for an expansion rule (to be described later)) indicates the relationship between a combination of one or more condition events which can occur in a node apparatus included in the computer system and a conclusion event which is presumed to be the root cause of the combination of condition events.

Generally, an event transfer model for identifying the root cause in failure analysis has a description of a combination of events which are expected to result from a certain failure and the root cause of the combination of events in the form of "IF-THEN" statements. Note that generic rules are not limited to the ones shown in FIGS. 8A and 8B, and there may be more rules.

Each generic rule includes, as constituent items, a field 33430 where a generic rule ID serving as the identifier of the generic rule is to be registered, a field 33410 where an observed phenomenon corresponding to the IF part of the generic rule described in the form of "IF-THEN" statements is to be registered, a field 33420 where a cause event corresponding to the THEN part of the generic rule described in the form of "IF-THEN" statements is to be registered, and a field 33440 where a topology that is acquired when the generic rule is expanded into an actual system to create an expansion rule is to be registered. If an event (events) in the condition part 33410 is (are) sensed, an event in the conclusion part 33420 is the root cause. When the status in the conclusion part 33420 returns to normal, the problem(s) in the condition part 33410 has (have) been resolved. Although two events are described in the condition part 33410 in each of the example in FIG. 8A, the number of events is not particularly limited.

For example, it can be seen from FIG. 8A that if a threshold value abnormality (a related event) in a response time for a logical volume on a host computer and a threshold value abnormality (a cause event) in processor usage of a controller in a storage apparatus are sensed as observed phenomena, a generic rule whose generic rule ID is denoted by reference characters Rule1 concludes that the threshold value abnormality in the processor usage of the controller in the storage apparatus is the cause of the events. When an expansion rule is to be created, topology information is acquired from the volume topology management table.

Note that a certain parameter at a normal level may be defined as an event included in an observed phenomenon. In the generic rule example shown in FIG. 8B, processor usage of a controller of a storage apparatus at a normal level is defined as an observed phenomenon.

<Configuration of Expansion Rule>

FIGS. 9A to 9D are charts showing configuration examples of an expansion rule in the expansion rule repository 33500 possessed by the management server 30000. The expansion rules are created by inserting pieces of data in fields of entries in the volume topology management table (FIG. 6) into the generic rules (FIGS. 8A and 8B).

Each expansion rule includes, as constituent items, a field 33530 where an expansion rule ID serving as the identifier of the expansion rule is to be registered, a field 33540 where a generic rule ID serving as the identifier of a generic rule serving as the basis for the expansion rule is to be registered, a field 33510 where an observed phenomenon corresponding to the IF part of the expansion rule described in the form of "IF-THEN" statements is to be registered, and a field 33520 where a cause event corresponding to the THEN part of the expansion rule described in the form of "IF-THEN" statements is to be registered.

For example, the expansion rule in FIG. 9A is created by inserting the controller name 33240, the host ID 33250, and the connection destination drive name 33260 of the first entry in FIG. 6 into the apparatus type field and the apparatus part type field in the generic rule whose generic rule ID is Rule1. It can be seen from FIG. 9A that the expansion rule whose expansion rule ID is denoted by reference characters ExRule1-1 is created on the basis of the generic rule whose generic rule ID is denoted by reference characters Rule1 and that if a threshold value abnormality in the response time for the logical volume on the host computer and a threshold value abnormality in the processor operating ratio of the controller in the storage apparatus are sensed as observed phenomena, the expansion rule concludes that the threshold value abnormality in the processor usage of the controller in the storage apparatus is the cause of the events.

<Configuration of Analysis Result Management Table>

FIG. 10 is a chart showing a configuration example of the analysis result management table 33600 possessed by the management server 30000.

The analysis result management table 33600 includes, as constituent items, a field 33610 where an apparatus ID serving as the identifier of a piece of equipment in which an event determined to be the root cause in the failure cause analysis process has occurred is to be registered, a field 33620 where the identifier of a part in the piece of equipment in which the event has occurred is to be registered, a field 33630 where the name of a metric for which a threshold value abnormality has been sensed is to be registered, a field 33640 where the ID of an expansion rule serving as the basis on which the event is determined to be the root cause is to be registered, a field 33650 where the incidence of an event (events) described in the condition part of the expansion rule is to be registered, a field 33660 where the ID of an actually received event of the event(s) described in the condition part of the expansion rule is to be registered, a field 33670 where whether a result of the analysis shows that the event is resolved is to be registered, a field 33680 where a period of time from occurrence of the received event to resolution of the event is to be registered, a field 33690 where whether the result of the analysis shows that the event is the result of an instantaneous failure is to be registered, and a field 33695 where the date and time when the failure analysis process associated with the occurrence of the event has been started is to be registered.

For example, it can be seen from the first row (the first entry) in FIG. 10 that the management server 30000 determines a threshold value abnormality in a processor operating ratio in the controller denoted by reference characters CTL1 of the storage apparatus SYS1 to be the root cause on the basis of the expansion rule ExRule1-1, that this is because events whose event IDs are denoted by reference characters EV1 and EV3 have been received, and that the condition event incidence is thus 2/2.

<About Configurations etc. of Other Management Tables>

The event type management table 33700 and the performance metric management table 33800 will be described later.

<Configuration Management Information Acquisition Process and Volume Topology Management Table Update Process>

The program control module 32100 instructs the information acquisition module 32200 to periodically acquire configuration management information from each of the storage apparatus 20000, the host computer 10000, and the IP switch 40000 in the computer system 1 by, e.g., polling processing.

The configuration management information acquisition module 32200 acquires configuration management information from each of the storage apparatus 20000, the host computer 10000, and the IP switch 40000 and updates the volume topology management table 33200.

<General Apparatus Performance Information Acquisition Process and Event Analysis Process>

Figure 11:
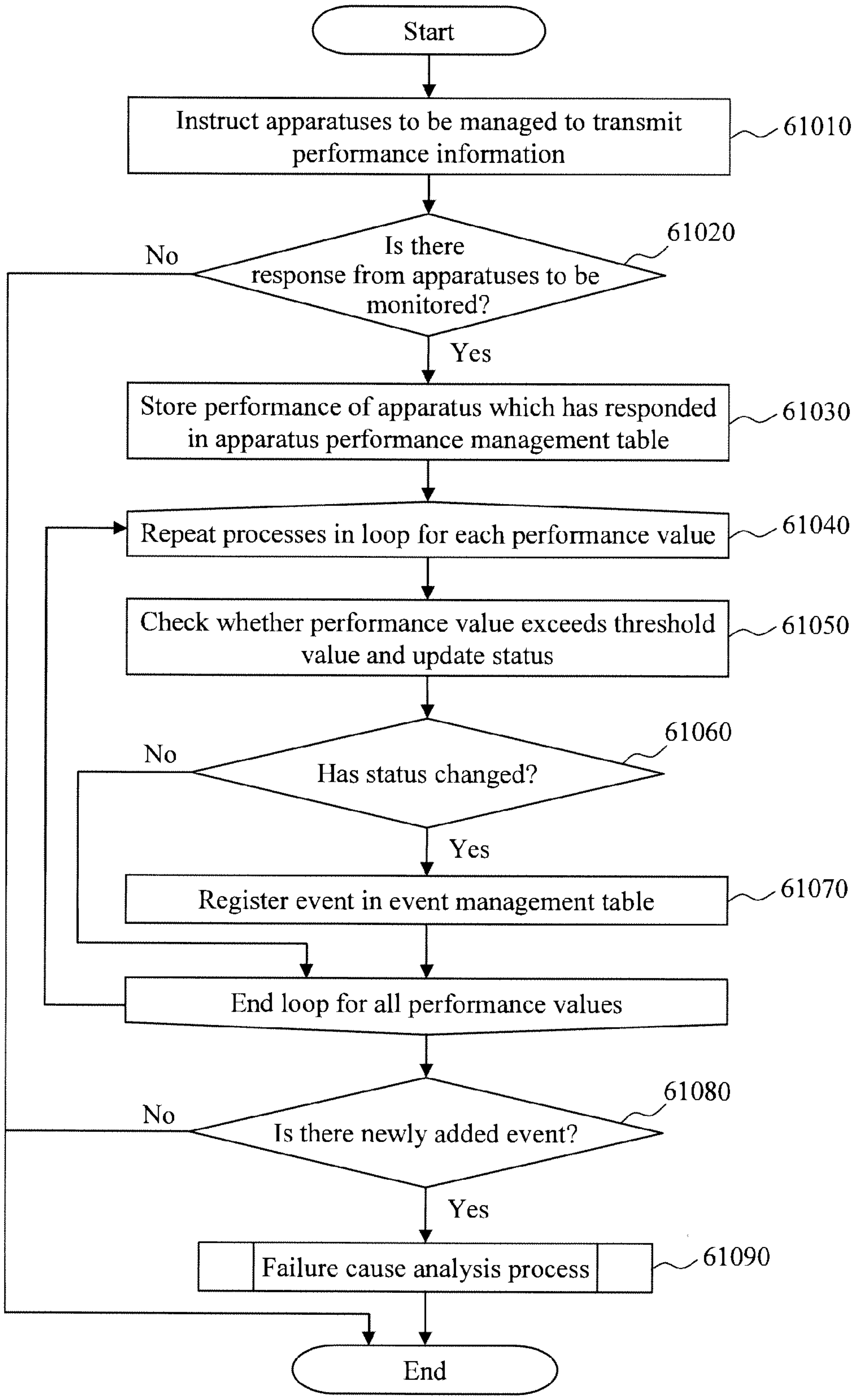
FIG. 11 is a flow chart for explaining the outline of a performance information acquisition process to be performed by the management server.

FIG. 11 is a flow chart for explaining a general apparatus performance information acquisition process to be performed by the apparatus performance information acquisition module 32300 of the management server 30000. The program control module 32100 instructs the apparatus performance information acquisition module 32300 to perform the apparatus performance information acquisition process during program startup or after a lapse of a fixed period of time from the last execution operation of the apparatus performance information acquisition process. Note that the execution instructions need not be issued at exactly regular intervals and only need to be repeatedly issued.

The apparatus performance information acquisition module 32300 repeatedly performs the series of processes below for each of apparatuses to be monitored.

The apparatus performance information acquisition module 32300 first instructs the apparatuses to be monitored to transmit configuration management information (step 61010).

The apparatus performance information acquisition module 32300 determines whether there is a response from the apparatuses to be monitored (step 61020). If there is any response with apparatus performance information from the apparatuses (Yes in step 61020), the apparatus performance information acquisition module 32300 stores the acquired apparatus performance information in the apparatus performance management table 33100 (step 61030). If there is no response with apparatus performance information from the apparatuses (No in step 61020), the apparatus performance information acquisition process ends.

The apparatus performance information acquisition module 32300 then refers to apparatus performance information stored in the apparatus performance management table 33100 and repeats the processes in steps 61050 to 61070 for each performance value (step 61040). The apparatus performance information acquisition module 32300 checks whether the performance value exceeds a threshold value and updates the status for the performance value registered in the apparatus performance management table 33100 (step 61050). The apparatus performance information acquisition module 32300 determines whether the status has changed from normal to threshold value abnormality and whether the status has changed from threshold value abnormality to normal (step 61060). If the status has changed (Yes in step 61060), the apparatus performance information acquisition module 32300 registers an event in the event management table 33300 (step 61070). On the other hand, if the status has not changed (No in step 61060), the flow returns to step 61050 unless the status check process is completed for all performance values.

After the above-described process is completed for all the performance values, the apparatus performance information acquisition module 32300 determines whether there is an event newly added by the series of processes (step 61080). If there is any additional event (e.g., a new abnormality has occurred during processing), the apparatus performance information acquisition module 32300 instructs the event analysis processing module 32500 to perform the failure cause analysis process shown in FIG. 12 (step 61090).

The apparatus performance information acquisition process to be performed by the apparatus performance information acquisition module 32300 has been described above.

<Details of Failure Analysis Process (Step 61090)>

Figure 12:
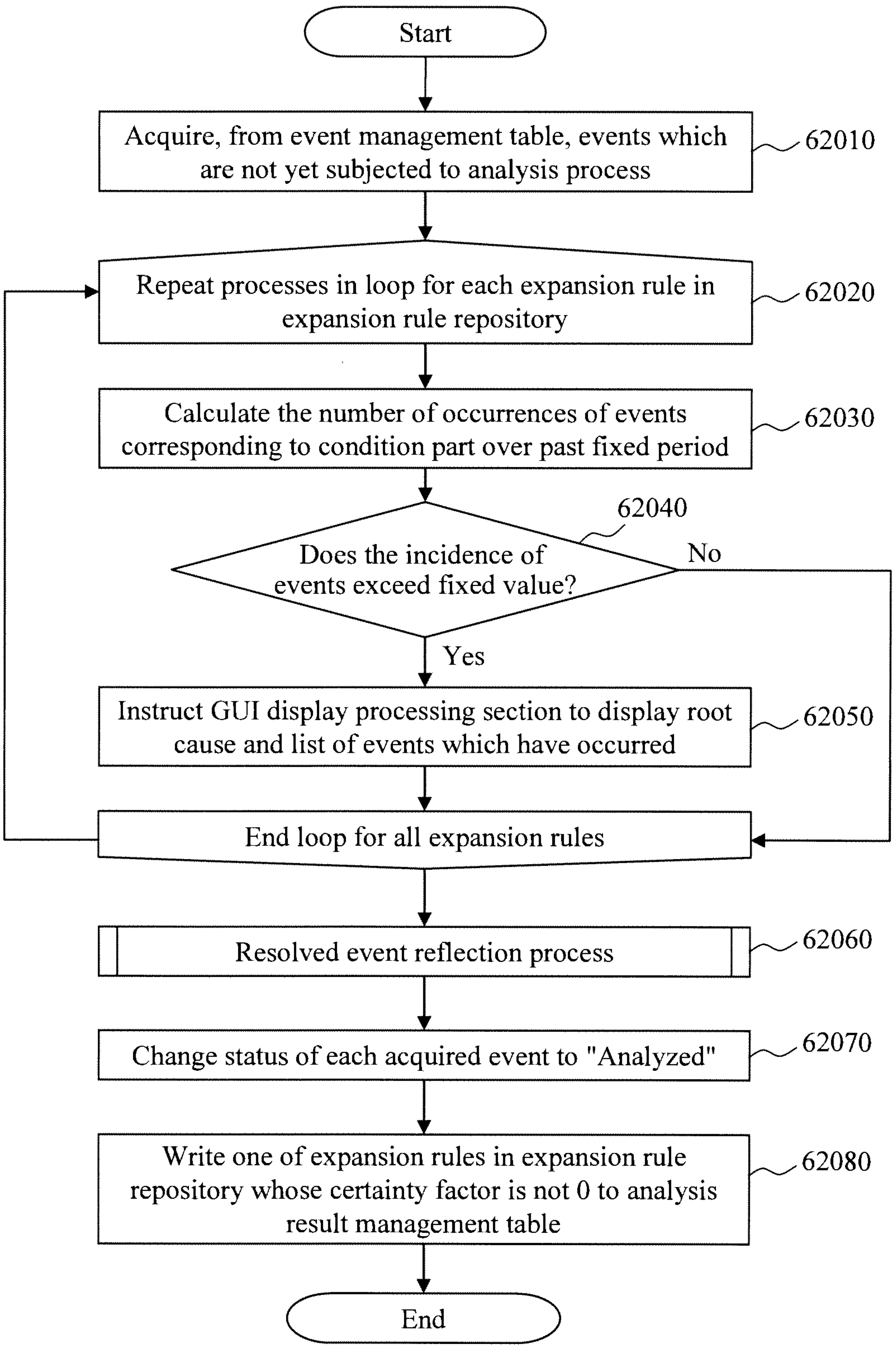
FIG. 12 is a flow chart for explaining a failure analysis process to be performed by the management server.

FIG. 12 is a flow chart for explaining the details of a general failure cause analysis process (step 61090 in FIG. 11) to be performed by the event analysis processing module 32500 of the management server 30000.

The event analysis processing module 32500 acquires, from the event management table 33300, an event whose resolved flag is not yet Yes (step 62010).

The event analysis processing module 32500 then repeats the processes in steps 62030 to 62050 for each of expansion rules in the expansion rule repository 33500 (step 62020). The event analysis processing module 32500 first calculates the number of occurrences for each of events corresponding to the condition part described in the expansion rule over the past fixed period (step 62030). The event analysis processing module 32500 determines whether the ratio of the number of occurrences of the events calculated in the process in step 62030 to the number of all the events described in the condition part exceeds a fixed value (step 62040). If the event analysis processing module 32500 determines that the ratio exceeds the fixed value (Yes in step 62040), it instructs the GUI display processing module 32400 to display one of the events which is the root cause together with the incidence of the events in the condition statement (step 62050) and ends the process for the expansion rule.

The event analysis processing module 32500 then performs a resolved event reflection process (FIG. 15) (step 62060). After that, the event analysis processing module 32500 refers to the event management table 33300 and sets the analyzed flag 33370 to Yes for each of the events acquired in step 62010 (step 62070).

Finally, the event analysis processing module 32500 writes one(s) of the expansion rules in the expansion rule repository whose certainty factor(s) is (are) not 0 to the analysis result management table 33600 (step 62080).

For example, "a threshold value abnormality in a response time for the logical volume (E:) in the host computer HOST1" and "a threshold value abnormality in the operating ratio of the controller CTL1 in the storage apparatus SYS1" are defined in the condition part of the expansion rule ExRule1-1 shown in FIG. 9A.

If "a threshold value abnormality in the operating ratio of the controller CTL1 in the storage apparatus SYS1" (occurrence date and time: Jan. 1, 2010 15:00:00) is registered in the event management table 33300 shown in FIG. 7, the event analysis processing module 32500 refers to the event management table 33300 after waiting a fixed period of time and acquires events which have occurred over the past fixed period.

The event analysis processing module 32500 calculates the number of occurrences over the past fixed period for each of the events corresponding to the condition part described in the expansion rule ExRule1-1 in the expansion rule repository 33500. Since "a threshold value abnormality in a response time for the logical volume (E:) in the host computer HOST1" (a related event) also has occurred during the past fixed period, the ratio of the total number of occurrences of the events (the cause event and the related event) corresponding to the condition part described in the expansion rule ExRule1-1 to the number of all the events described in the condition part is 2/2.

If the ratio calculated in the above-described manner exceeds the fixed value, the event analysis processing module 32500 instructs the GUI display processing module 32400 to display one of the events which is the root cause together with the incidence of the events in the condition statement. For example, assume that the fixed value is 80%. In the specific example, since the incidence of the events in the condition part of the expansion rule ExRule1-1 over the past fixed period is 2/2, i.e., 100%, a result of the analysis is displayed in a GUI.

The above-described processes are performed for each of all the expansion rules defined in the expansion rule repository 33500.

The failure cause analysis process to be performed by the event analysis processing module 32500 has been described above.

In the above-described failure cause analysis process, if failures occur frequently in a short period, a larger number of failure analysis results are saved. However, since each failure analysis result does not include information on response priority, the time until a manager refers to one for which measures are to be taken is long. This results in an increase in the time required to resolve a target failure.

For this reason, the embodiment of the present invention newly provides a resolved event reflection process in order to allow display of an analysis result together with processing priority.

<Details of Resolved Event Reflection Process>

In order to solve the prior-art problem, according to the first embodiment of the present invention, the resolved event reflection process in the management server 30000 is added. The details of information and operation necessary for the resolved event process will be described below.

<Configuration of Event Type Management Table>

FIG. 13 is a chart showing a configuration example of the event type management table 33700 possessed by the management server 30000. The event type management table 33700 includes, as constituent items, a field 33710 where the type of a piece of equipment managed by the management server is to be registered, a field 33720 where a part in the piece of equipment from which performance information is to be acquired is to be registered, a field 33730 where the name of a metric to be acquired from the piece of equipment is to be registered, a field 33740 where possible status values (event types) for the metric are to be registered, and a field 33750 where whether the status means a change from abnormal to normal is to be registered.

For example, in FIG. 13, of status values pertaining to the response time of a drive of a server (host computer), "excess over threshold value (threshold value abnormality)" and "unknown" do not mean a change from abnormal to normal while "normal" means a change from abnormal to normal.

<Configuration of Performance Metric Management Table>

FIG. 14 is a chart showing a configuration example of the performance metric management table 33800 possessed by the management server 30000. The performance metric management table 33800 includes, as constituent items, a field 33810 where the type of a piece of equipment managed by the management server is to be registered, a field 33820 where a part in the piece of equipment from which performance information is to be acquired is to be registered, a field 33830 where the name of a metric to be acquired from the piece of equipment is to be registered, a field 33840 where OS type values which the piece of equipment can take are to be registered, and a field 33850 where a method for calculating the value of the metric is to be registered.

FIG. 14 shows an example of the specific values of performance metrics of the management server 30000. More specifically, FIG. 14 shows that the management server 30000 monitors the response time of a drive of the server (the host computer 10000) and acquires an integrated value from the host computer 10000, whose OS is Windows (registered trademark), and an instantaneous value from the management server 30000, whose OS is Linux, during the monitoring. The term "instantaneous value" here refers to, for example, an instantaneous value in an extremely short measurement period (e.g., a performance value at the time of access) calculated as a performance value when the performance value is to be calculated in a piece of equipment to be managed. The term "integrated value" refers to, for example, an average value in a somewhat long measurement period calculated as a performance value (e.g., a value obtained by adding up performance values during a measurement period of time of 5 minutes and averaging the performance values).

In FIG. 14, the acquired value type 33850 of "integrated value" means that the failure analysis process is performed by calculating an integrated value for a corresponding combination of a device type and a metric.

<Details of Resolved Event Reflection Process (Step 62020) according to Present Invention>

Figure 15:
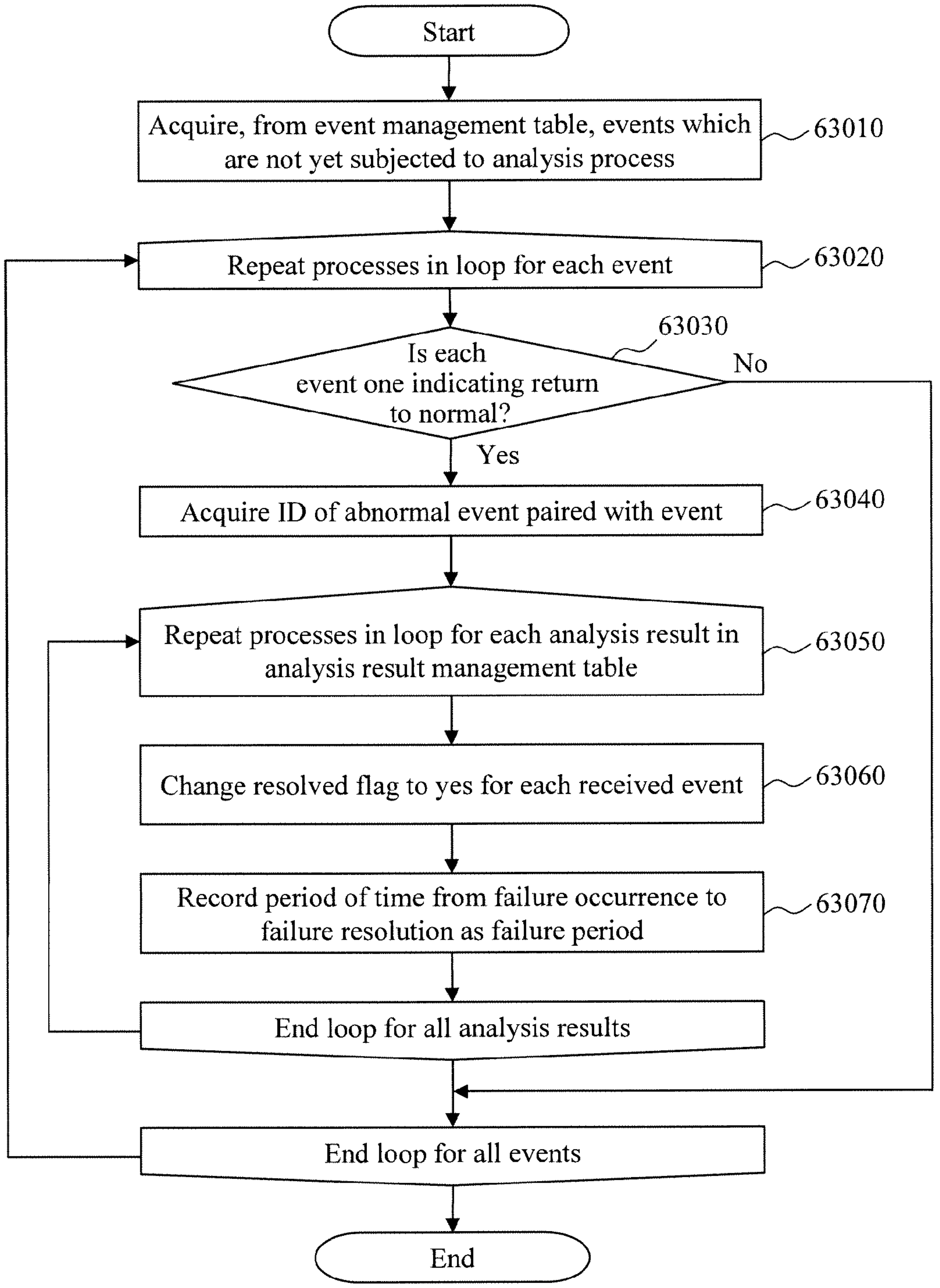
FIG. 15 is a flow chart for explaining a resolved event reflection process to be performed by the management server according to a first embodiment.

FIG. 15 is a flow chart for explaining the resolved event reflection process (step 62060) to be performed by the event analysis processing module 32500 of the management server 30000. Note that the process is to be performed immediately before step 62070 of the failure cause analysis process, as shown in FIG. 12.

The event analysis processing module 32500 acquires events whose resolved flag are not yet Yes from the event management table 33300 (step 63010). The event analysis processing module 32500 repeats the processes below for each of the acquired events (step 63020).

The event analysis processing module 32500 checks the event type management table 33700 and checks whether each event means problem resolution (an event whose status is normal) (step 63030). That is, the event analysis processing module 32500 focuses on one of metrics (e.g., an operating ratio, a response time, and an I/O amount) and checks whether the status (see reference numeral 33360 in FIG. 7) corresponding to the metric is "normal." If the event does not indicate a resolved state (No in step 63030), the flow shifts to processing of the next event. On the other hand, if the event indicates a resolved state (Yes in step 63030), the event analysis processing module 32500 performs the processes below.

The event analysis processing module 32500 checks the event management table 33300 and acquires the ID of an abnormal event which is paired with the resolved event (step 63040).

The event analysis processing module 32500 then refers to the analysis result management table 33600 and repeats the series of processes below for each of analysis results defined in the analysis result management table (step 63050).

The event analysis processing module 32500 changes a resolved flag to Yes for the abnormal event paired with the resolved event (step 63060). The event analysis processing module 32500 then checks the event management table 33300, calculates a period of time from occurrence of the failure to resolution of the failure, and records the period of time as a failure period in the analysis result management table 33600 (FIG. 10) (step 63070).

The resolved event reflection process to be performed by the event analysis processing module 32500 has been described above.

A specific example of implementation of the resolved event reflection process will be described below. Assume that the analysis result management table at the beginning of the process is as shown in FIG. 10, that the event type management table is as shown in FIG. 13, and that the expansion rule ExRule1-1 is as shown in FIG. 9A.

If "a status value of normal for the operating ratio of the controller CTL1 in the storage apparatus SYS1" (occurrence date and time: Jan. 1, 2010 15:05:00) is registered in the event management table shown in FIG. 7, the event analysis processing module 32500 refers to the event management table and acquires events which have occurred over the past fixed period.

The event analysis processing module 32500 then checks the event type management table 33700 for the event and checks whether the event indicates problem resolution. The checking of the event type management table 33700 shows that "a status value of normal for the operating ratio of a controller in a storage apparatus" is a status value indicating that the event is a resolved event.

The event analysis processing module 32500 also checks the event management table 33300 and acquires the ID of an abnormal event which is paired with the resolved event. The reference to the event management table 33300 shows that "a threshold value abnormality in the operating ratio of the controller CTL1 in the storage apparatus SYS1" (occurrence date and time: Jan. 1, 2010 15:00:00) had occurred immediately before "the status value of normal for the operating ratio of the controller CTL1 in the storage apparatus SYS1" (occurrence date and time: Jan. 1, 2010 15:05:00). This event is the paired abnormal event. The event ID of the event is "EV1."

The event analysis processing module 32500 refers to the analysis result management table 33600 and changes a resolved flag to Yes for the event whose event ID is denoted by reference characters "EV1" of events included in analysis results defined in the analysis result management table 33600. The event analysis processing module 32500 also records a period of time from occurrence of the failure to resolution of the failure as a failure period. Since the received event EV1 has been resolved in 5 minutes from the occurrence, the value is registered as the failure period.

When "a status value of normal for the response time of the drive (E:) in the host computer HOST1" (occurrence date and time: Jan. 1, 2010 15:10:00) is registered in the event management table 33300, the event analysis processing module 32500 changes a resolved flag for an event EV3 paired with the event to Yes. The event analysis processing module 32500 records a period of time from occurrence of the failure to resolution of the failure as a failure period in the analysis result management table 33600. Since the received event EV3 has been resolved in 10 minutes from the occurrence in the specific example, the value is registered as the failure period in the analysis result management table 33600.

<Configuration of Failure Analysis Result Display Screen>

FIG. 16 is a view showing a display example 71000 of a failure analysis result display screen to be displayed to a user (manager) by the management server 30000.

In the failure analysis result display screen 71000, of analysis results defined in the analysis result management table, one in which all of received events are resolved is displayed separately from the others and is displayed together with a failure period (a table 71020). If one analysis result handles a plurality of received events, the longest one of the resolution periods of time of the events is displayed.

An analysis result in which not all of received events are resolved is displayed in a separate table (a table 71010).

<Effect of Resolved Event Reflection Process>

As described above, according to the first embodiment, when management software of the management server 30000 senses that the status of a piece of equipment which had been abnormal has returned to normal after the failure cause analysis process shown in FIG. 12, it displays, of failure analysis results, one in which an equipment abnormality, based on which the failure analysis result is derived, is resolved in a GUI separately from the other analysis results. If a failure analysis result is derived based on a plurality of failure events, the failure analysis result is displayed in the GUI separately from the other failure analysis results when all of the failure events are confirmed to be resolved. As a result, a user can easily determine the response priority of each analysis result, and the load required for analysis result checking can be reduced.

(2) Second Embodiment

A second embodiment relates to an instantaneous failure event reflection process by management software (included in, e.g., a management server 30000). The system configuration and the configurations of apparatuses are the same as those in the first embodiment, and a description thereof will be omitted.

<Details of Instantaneous Failure Event Reflection Process>

In this embodiment, the management server 30000 performs the instantaneous failure event reflection process. Note that a piece of configuration management information to be possessed by the management server 30000 is the same as one in the first embodiment.

Figure 17:
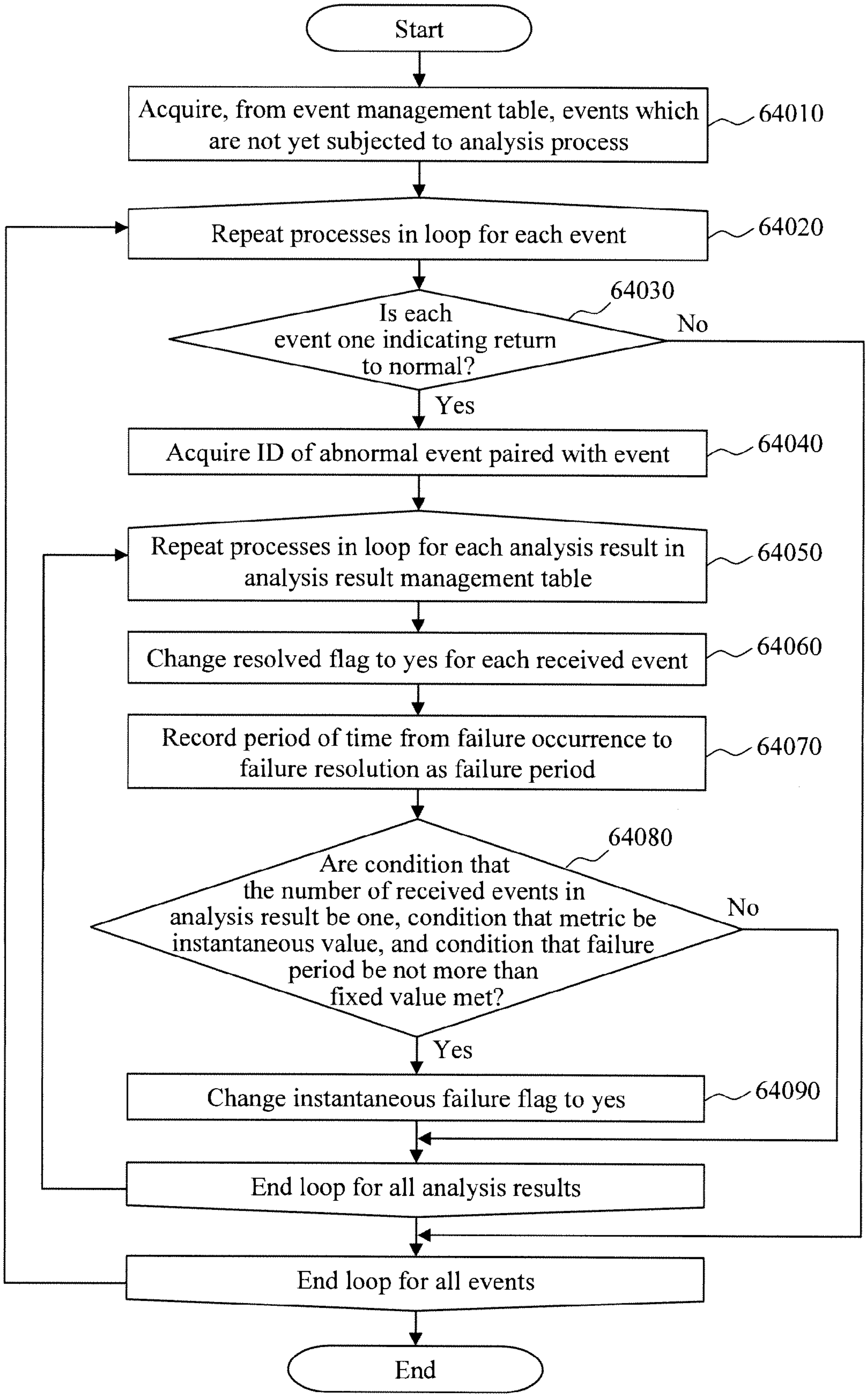
FIG. 17 is a flow chart for explaining an instantaneous failure event reflection process to be performed by a management server according to a second embodiment.

FIG. 17 is a flow chart for explaining the details of the instantaneous failure event reflection process to be performed by an event analysis processing module 32500 of the management server 30000 according to the second embodiment. The instantaneous failure event reflection process is performed instead of the resolved event reflection process (step 62060) in FIG. 12 and is performed immediately before step 62070 of the failure cause analysis process, as shown in FIG. 12.

In FIG. 17, the event analysis processing module 32500 first acquires events whose resolved flag are not yet Yes from an event management table 33300 (step 64010). The event analysis processing module 32500 repeats the processes below for each of the acquired events (step 64020).

The event analysis processing module 32500 checks an event type management table 33700 and checks whether each event means problem resolution (step 64030). If the event does not indicate a resolved state, the flow shifts to processing of the next event. On the other hand, if the event indicates a resolved state, the event analysis processing module 32500 performs the processes below.

The event analysis processing module 32500 checks the event management table 33300 and acquires the ID of an abnormal event which is paired with the resolved event (step 64040).

The event analysis processing module 32500 then refers to an analysis result management table 33600 and repeats the series of processes below for each of analysis results defined in the analysis result management table (step 64050).

The event analysis processing module 32500 changes a resolved flag to Yes for the abnormal event paired with the resolved event (step 64060).

The event analysis processing module 32500 checks the event management table 33300, calculates a period of time from occurrence of the failure to resolution of the failure, and records the period of time as a failure period in the analysis result management table 33600 (step 64070).

The event analysis processing module 32500 then checks whether the number of received events in the analysis result is one, the metric of the received event is an instantaneous value, and the calculated failure period is not more than intervals at which apparatus performance is acquired in the apparatus performance information acquisition process shown in FIG. 11 (step 64080). The reason why whether the number of received events in an analysis result is one is checked in step 64080 is that if a failure event described in one expansion rule (see FIGS. 9) (an event in the condition part) occurs alone, the failure event is highly likely to be an event not affecting a connected different IT system. That is, if only one of events in the condition part is occurring, the event is highly likely to be merely occurring momentarily. In contrast, if a plurality of ones of failure events described in one expansion rule occur simultaneously, it is highly possible that there are causal relationships between the failure events and that a failure requiring measures has occurred. Note that although whether the number of events which has occurred is only one is determined here, whether the incidence of events (certainty factor) is less than a predetermined threshold value used in the failure analysis result may be determined instead. The reason why whether the failure period is not more than the intervals at which apparatus performance is acquired is checked in step 64080 is that if the manager server recognizes a threshold value abnormality in an apparatus to be monitored and then finds at the time of the next performance acquisition operation that the threshold value abnormality has already been resolved, the threshold value abnormality recognized first is highly likely to be accidental.

If it is determined in step 64080 that the analysis result does not meet all the conditions, the flow shifts to processing of the next analysis result. On the other hand, if it is determined that in step 64080 the analysis result meets all the conditions, the event analysis processing module 32500 changes the instantaneous failure flag of the analysis result to Yes (step 64090). The purpose of change of this flag to Yes is to distinguish analysis results according to whether the received event is an instantaneous failure or not and display one in which the received event is an instantaneous failure separately from others, as in FIG. 18.

The instantaneous failure event reflection process to be performed by the event analysis processing module 32500 has been described above.

A specific example of implementation of the instantaneous failure event reflection process will be described below. Assume that the analysis result management table at the beginning of the process is as shown in FIG. 10, that the event type management table is as shown in FIG. 13, and that the expansion rule ExRule1-1 is as shown in FIG. 9A.

If "a status value of normal for the operating ratio of a controller CTL1 in a storage apparatus SYS1" (occurrence date and time: Jan. 1, 2010 16:05:00) is registered in the event management table shown in FIG. 7, the event analysis processing module 32500 refers to the event management table 33300 (FIG. 7) and acquires events which have occurred over the past fixed period.

The event analysis processing module 32500 then checks the event type management table 33700 for the events and checks whether each event means problem resolution. The checking of the event type management table 33700 shows that "a status value of normal for the operating ratio of a controller in a storage apparatus" is a status value indicating that the event is a resolved event.

The event analysis processing module 32500 also checks the event management table 33300 and acquires the ID of an abnormal event which is paired with the resolved event. The reference to the event management table 33300 shows that "a status value of threshold abnormality for the response time of a drive (E:) in a host computer HOST1 (OS type: Linux)" (occurrence date and time: Jan. 1, 2010 16:00:00) had occurred immediately before "the status value of normal for the response time of the drive (E:) in the host computer HOST1 (OS type: Linux)" (occurrence date and time: Jan. 1, 2010 16:05:00). This event is the paired abnormal event. The event ID of the event is "EV5."

The event analysis processing module 32500 further refers to the analysis result management table 33600 and changes a resolved flag to Yes for an event whose event ID is denoted by reference characters "EV5" of events included in analysis results defined in the analysis result management table 33600. The event analysis processing module 32500 also records a period of time from occurrence of the failure to resolution of the failure as a failure period. Since the received event EV5 has been resolved in 5 minutes from the occurrence, the value is registered as the failure period in the analysis result management table 33600.

The event analysis processing module 32500 then checks whether the number of received events in the analysis event is one, the metric of the received event is an instantaneous value, and the failure period is not more than a fixed value. Assume that the third condition is met if the failure period is less than 10 minutes. Since the failure period is 5 minutes in this example, the condition is met. Reference to the performance metric management table shown in FIG. 14 shows that the response time for a drive in a host computer whose OS type is Linux is an "instantaneous value." Since the analysis result meets all the conditions, the event analysis processing module 32500 changes an instantaneous failure flag 33690 in the analysis result management table 33600 to Yes.

<Configuration of Failure Analysis Result Display Screen>

FIG. 18 is a view showing a display example 71000 of a failure analysis result display screen to be displayed to a manager (user) by the management server 30000.

In the failure analysis result display screen 71000, of analysis results defined in the analysis result management table 33600, one whose instantaneous failure flag is Yes is displayed separately from the others and is displayed together with a failure period (a table 71030). If one analysis result handles a plurality of received events, the longest one of the resolution periods of time of the events is displayed.

<Effect of Instantaneous Failure Event Reflection Process>

As described above, when system management software senses that the status of a piece of equipment which had been abnormal has returned to normal after the system management software receives a failure event which occurs when a piece of equipment to be managed is not in a condition interfering with business and is resolved immediately after the occurrence, the system management software saves a failure cause candidate together with a certainty factor as a failure analysis result when an equipment abnormality, based on which the failure event has been issued, is completely resolved. The system management software also displays the failure analysis result in a GUI separately from other analysis results. As a result, a user can easily determine the response priority of each analysis result, and the load required for analysis result checking can be reduced.

(3) Third Embodiment

A third embodiment relates to a process of setting response priority for a failure analysis result by management software (included in, e.g., a management server 30000). The system configuration and the configurations of apparatuses are the same as those in the first embodiment except for an analysis result management table 33600 shown in FIG. 19, and a description thereof will be omitted.

<Configuration of Analysis Result Management Table>

FIG. 19 is a chart showing a configuration example of the analysis result management table 33600 possessed by the management server 30000.

The analysis result management table 33600 includes, as a constituent item, a field 33691 where user processing priority for an analysis result is to be registered. Other constituent items are the same as those in the analysis result management table 33600 shown in FIG. 10.

In this embodiment, the higher processing priority assigned to an analysis result, the more urgently a user is required to take measures. The maximum value of processing priority is 10, and the minimum value is 0. When an analysis result is registered in the analysis result management table 33600, processing priority is set to 10.

<Resolved Event Reflection Process>

Figure 20:
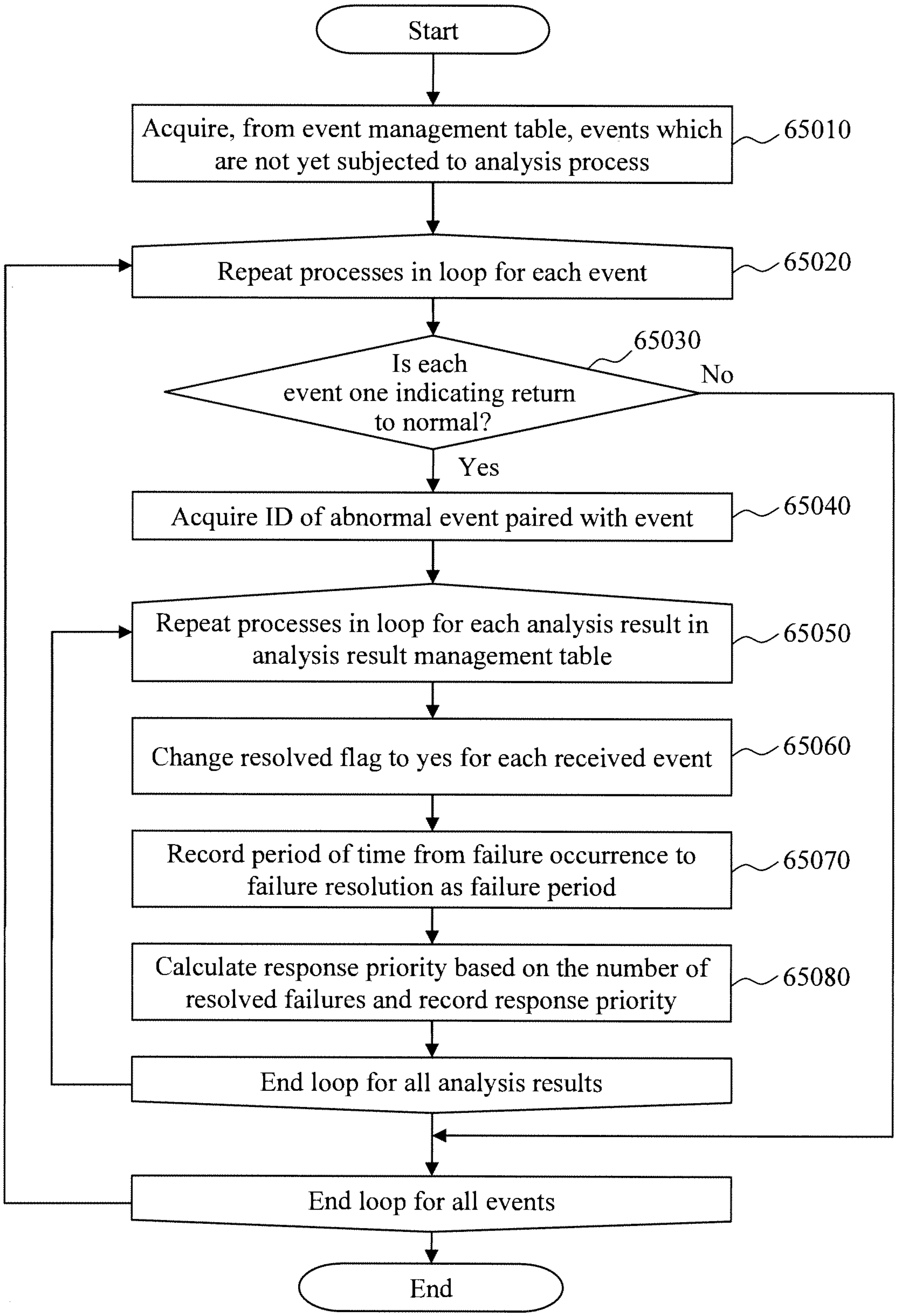
FIG. 20 is a flow chart for explaining a process of setting response priority for a failure analysis result to be performed by the management server according to the third embodiment.

FIG. 20 is a flow chart for explaining the process of setting response priority for a failure analysis result to be performed by an event analysis processing module 32500 of the management server 30000. Note that the process is to be performed immediately before step 62070 of the failure cause analysis process shown in FIG. 12 instead of the resolved event reflection process (step 62060) in FIG. 12.

The event analysis processing module 32500 acquires events whose resolved flag are not yet Yes from an event management table 33300 (step 65010). The event analysis processing module 32500 repeats the processes below for each of the acquired events (step 65020).

The event analysis processing module 32500 first refers to an event type management table 33700 and checks whether status 33360 of each of the events to be processed means problem resolution (step 65030). For example, if the status for the operating ratio of a controller indicates a threshold abnormality in the event management table 33300, the event is not a resolved event. If the event does not indicate a resolved state (No in step 65030), the flow shifts to processing of the next event. On the other hand, if the event indicates a resolved state (Yes in step 65030), the flow shifts to step 65040.

The event analysis processing module 32500 checks the event management table 33300 and acquires the ID of an abnormal event which is paired with the resolved event (step 65040).

The event analysis processing module 32500 then refers to the analysis result management table 33600 and repeats the series of processes below for each of analysis results defined in the analysis result management table 33600 (step 65050).

The event analysis processing module 32500 changes a resolved flag to Yes for the abnormal event paired with the resolved event (step 65060).

The event analysis processing module 32500 checks the event management table 33300, calculates a period of time from occurrence of the failure to resolution of the failure, and records the period of time as a failure period in the analysis result management table 33600 (step 65070).

The event analysis processing module 32500 calculates response priority on the basis of the number of resolved ones of failure events in the analysis result and records the response priority in the analysis result management table 33600 (step 65080). For example, if one of two failure events in an analysis result is resolved, the response priority is calculated to be 5 ("10×(1/2)=5"). Processing priority is 0 when all of failure events in an analysis result are resolved and is 10 when all of the failure events are unresolved. As described above, processing priority ranges from 0 to 10 depending on the number of failure events in a condition part and the number of resolved ones of the failure events.

The process of setting response priority for a failure analysis result to be performed by the event analysis processing module 32500 has been described above.

<Configuration of Failure Analysis Result Display Screen>

FIG. 21 is a view showing a display example 71000 of a failure analysis result display screen to be displayed to a user by the management server 30000.

In the failure analysis result display screen 71000, analysis results defined in the analysis result management table are displayed together with response priority (a table 71010).

<Effect of Process of Setting Response Priority for Failure Analysis Result>

A method for displaying the response priority of a failure analysis result in the failure analysis result display screen 71000 has been described as one of methods for allowing a manager (user) to easily determine the response priority of an analysis result in the third embodiment. Other examples of a method for a user to calculate the response priority for an analysis result include the following:

(A) a process of setting lower processing priority for an analysis result than for other analysis results if a failure determined to be the root cause based on the analysis result is a failure hard to be responded to by a user; and (B) a process of setting lower processing priority for an analysis result than for other analysis results if a failure determined to be the root cause based on the analysis result is a failure which has occurred in a piece of equipment with a multiplex configuration.

By displaying the response priority of an analysis result as described above, a user can easily determine the response priority of each analysis result, and the load required for analysis result checking can be reduced. Note that the priority display can be implemented in combination with separate display in the first embodiment. That is, priority may be calculated for an unresolved analysis result displayed separately from a resolved analysis result in the first embodiment, and the priority information may be displayed to accompany the unresolved analysis result.

(4) Summary

In the embodiments of the present invention, an abnormality is sensed from the performance value of each node apparatus, and an analysis result for the abnormality (in which the certainty factor for the abnormality is calculated) is presented to a manager. If the node apparatus under the abnormal condition returns to normal without special measures after a lapse of time, the analysis result is presented to the manager by marking the analysis result with a flag meaning return to normal without changing the value of the certainty factor. This is because a certainty factor is an evaluation value for an analysis result, and the evaluation value should not be changed even after a lapse of time. The above-described configuration makes it possible to separately display a resolved analysis result and an unresolved analysis result and display a result for which a failure is to be responded to together with priority information. The manager thus can efficiently narrow down failures more apparently to be responded to.

An instantaneous failure analysis result for a failure which is considered to be merely a temporary failure is presented to a manager separately from other failure analysis results (see, for example, FIG. 18). This makes it possible to postpone responding to a failure described in an instantaneous failure analysis result and allows the manager to very efficiently manage a computer system.

Note that the present invention can also be realized by program codes of software that implement the functions of the embodiments. In this case, a storage medium having recorded thereon the program codes is provided to a system or an apparatus, and a computer (or a CPU or an MPU) in the system or apparatus reads the program codes stored in the storage medium. The program codes themselves read from the storage medium implement the functions of the aforementioned embodiments, and the program codes themselves and the storage medium having recorded thereon the program codes constitute the present invention. Examples of the storage medium for supplying such program codes include a flexible disk, a CD-ROM, a DVD-ROM, a hard disk, an optical disk, a magneto-optical disk, a CD-R, a magnetic tape, a nonvolatile memory card, and a ROM.

In accordance with instructions of the program codes, an OS (operating system) running on the computer or the like may perform some or all of actual processes, and the functions of the aforementioned embodiments may be implemented by those processes. Further, after the programs codes read from the storage medium are written to memory in the computer, the CPU or the like of the computer may perform some or all of the actual processes in accordance with the instructions of the program codes, and the functions of the aforementioned embodiments may be implemented by those processes.

The program codes of the software that implement the functions of the embodiments may be distributed via a network to be stored in a storage section such as a hard disk or the memory in the system or apparatus, or the storage medium such as a CD-RW or a CD-R, and at the point of use, the computer (or the CPU or MPU) in the system or apparatus may read the program codes stored in the storage section or storage medium and execute the program codes.

REFERENCE SIGNS LIST

10000: server
20000: storage apparatus
30000: management server
35000: Web browser start server
40000: IP switch
45000: network

The invention claimed is:

1. A management method for a computer system comprising a node apparatus serving as an object to be monitored and a management system which is coupled to the node apparatus over a network and monitors and manages the node apparatus, comprising:

acquiring a processing performance value indicating processing performance of the node apparatus and sensing a status of the node apparatus from the acquired processing performance value, by the management system;

applying the sensed status to an analysis rule indicating a relationship between a combination of one or more condition events which may occur in the node apparatus and a conclusion event which is presumed to be a root cause of the combination of the condition events and calculating a certainty factor which is information indicating possibility of occurrence of a failure in the node apparatus, by the management system;

determining, from the certainty factor, whether a failure has occurred in the node apparatus, by the management system;

displaying an unresolved failure analysis result which is a failure analysis result for the node apparatus when the status remains abnormal and a resolved failure analysis result which is a failure analysis result for the node apparatus when the status has changed from abnormal to normal on a display screen without changing information on the certainty factor if it is determined that a failure has occurred in the node apparatus, by the management system.

2. The management method for the computer system, according to claim 1, wherein the management system separately displays the unresolved failure analysis result and the resolved failure analysis result on the display screen.

3. The management method for the computer system, according to claim 1, further comprising displaying processing priority on the display screen for each of the unresolved failure analysis result and the resolved failure analysis result, by the management system.

4. The management method for the computer system, according to claim 3, wherein the management system calculates the processing priority on the basis of the number of resolved ones of the one or more condition events in the unresolved failure result.

5. The management method for the computer system, according to claim 1, further comprising calculating a failure period indicating a period of time until the status changes from abnormal to normal and displaying the resolved failure analysis result on the display screen together with the failure period, by the management system.

6. The management method for the computer system, according to claim 5, wherein the management system performs a process of determining whether the certainty factor is less than a predetermined value, checking the type of the processing performance value of the node apparatus to determine whether the processing performance value is an instantaneous value which is instantaneously obtained or an integrated value which is obtained by adding up performance values for a predetermined period, and determining whether the failure period is not more than a predetermined value, when calculating the failure period, and displays one of the resolved failure analysis result whose certainty factor is less than the predetermined value, whose processing performance value is the instantaneous value, and whose failure period is not more than the predetermined value on the display screen separately from the remainder of the resolved failure analysis result and the unresolved failure analysis result.

7. The management method for the computer system, according to claim 1, wherein the node apparatus comprises a plurality of host computers and a plurality of storage apparatuses, the management system manages the processing performance value of the node apparatus for each of the constituent devices of the node apparatus, the management system acquires a constituent device performance value indicating processing performance of each constituent device of the node apparatus and senses a status of the constituent device of the node apparatus from the acquired constituent device performance value, the management system applies the sensed status of each constituent device to the analysis rule, calculates the certainty factor, and determines that a failure has occurred when the certainty factor is not less than a predetermined value, the management system separately displays the unresolved failure analysis result and the resolved failure analysis result on the display screen and also displays processing priority which is calculated based on the number of resolved ones of the one or more condition events for each of the unresolved failure analysis result and the resolved failure analysis result, and the management system calculates a failure period indicating a period of time until the status changes from abnormal to normal for the resolved failure analysis result, displays the resolved failure analysis result on the display screen together with the failure period, performs a process of determining whether the certainty factor is less than a predetermined value, checking the type of the processing performance value of the node apparatus to determine whether the processing performance value is an instantaneous value which is instantaneously obtained or an integrated value which is obtained by adding up performance values for a predetermined period, and determining whether the failure period is not more than a predetermined value, when calculating the failure period, and displays one of the resolved failure analysis result whose certainty factor is less than the predetermined value, whose processing performance value is the instantaneous value, and whose failure period is not more than the predetermined value on the display screen separately from the remainder of the resolved failure analysis result and the unresolved failure analysis result.

8. A management system coupled to a node apparatus serving as an object to be monitored over a network for managing the node apparatus, comprising:

a processor which acquires a processing performance value indicating processing performance of the node apparatus and senses a status of the node apparatus from the acquired processing performance value; and a memory which stores an analysis rule indicating a relationship between a combination of one or more condition events which may occur in the node apparatus and a conclusion event which is presumed to be a root cause of the combination of the condition events, wherein the processor applies the sensed status to the analysis rule and calculates a certainty factor which is information indicating possibility of occurrence of a failure in the node apparatus, determines, from the certainty factor, whether a failure has occurred in the node apparatus, and displays an unresolved failure analysis result which is a failure analysis result for the node apparatus when the status remains abnormal and a resolved failure analysis result which is a failure analysis result for the node apparatus when the status has changed from abnormal to normal on a display screen without changing information on the certainty factor if it is determined that a failure has occurred in the node apparatus.

9. The management system according to claim 8, wherein the processor separately displays the unresolved failure analysis result and the resolved failure analysis result on the display screen.

10. The management system according to claim 8, wherein the processor displays processing priority on the display screen to accompany each of the unresolved failure analysis result and the resolved failure analysis result.

11. The management system according to claim 10, wherein the processor calculates the processing priority on the basis of the number of resolved ones of the one or more condition events in the unresolved failure result.

12. The management system according to claim 8, wherein the processor calculates a failure period indicating a period of time until the status changes from abnormal to normal and displays the resolved failure analysis result on the display screen together with the failure period.

13. The management system according to claim 12, wherein the processor performs a process of determining whether the certainty factor is less than a predetermined value, checking the type of the processing performance value of the node apparatus to determine whether the processing performance value is an instantaneous value which is instantaneously obtained or an integrated value which is obtained by adding up performance values for a predetermined period, and determining whether the failure period is not more than a predetermined value, when calculating the failure period, and displays one of the resolved failure analysis result whose certainty factor is less than the predetermined value, whose processing performance value is the instantaneous value, and whose failure period is not more than the predetermined value on the display screen separately from the remainder of the resolved failure analysis result and the unresolved failure analysis result.

14. The management system according to claim 8, wherein the node apparatus comprises a plurality of host computers and a plurality of storage apparatuses, the processor manages the processing performance value of the node apparatus for each of the constituent devices of the node apparatus, acquires a constituent device performance value indicating processing performance of each constituent device of the node apparatus and senses a status of the constituent device of the node apparatus from the acquired constituent device performance value, applies the sensed status of each constituent device to the analysis rule, calculates the certainty factor, and determines that a failure has occurred when the certainty factor is not less than a predetermined value, separately displays the unresolved failure analysis result and the resolved failure analysis result on the display screen and also displays processing priority which is calculated based on the number of resolved ones of the one or more condition events on the display screen to accompany each of the unresolved failure analysis result and the resolved failure analysis result, and calculates a failure period indicating a period of time until the status changes from abnormal to normal for the resolved failure analysis result, displays the resolved failure analysis result on the display screen together with the failure period, performs a process of determining whether the certainty factor is less than a predetermined value, checking the type of the processing performance value of the node apparatus to determine whether the processing performance value is an instantaneous value which is instantaneously obtained or an integrated value which is obtained by adding up performance values for a predetermined period, and determining whether the failure period is not more than a predetermined value, when calculating the failure period, and displays one of the resolved failure analysis result whose certainty factor is less than the predetermined value, whose processing performance value is the instantaneous value, and whose failure period is not more than the predetermined value on the display screen separately from the remainder of the resolved failure analysis result and the unresolved failure analysis result.

* * * * *